(12) United States Patent
Ikeda

(10) Patent No.: US 12,015,847 B2
(45) Date of Patent: *Jun. 18, 2024

(54) IMAGE PROCESSING APPARATUS FOR CHANGING A PRIORITY CATEGORY FOR OBJECT DETECTION, IMAGE PICKUP APPARATUS, IMAGE PROCESSING METHOD, AND STORAGE MEDIUM

(71) Applicant: CANON KABUSHIKI KAISHA, Tokyo (JP)

(72) Inventor: Hitoshi Ikeda, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/991,896

(22) Filed: Nov. 22, 2022

(65) Prior Publication Data

US 2023/0089239 A1 Mar. 23, 2023

Related U.S. Application Data

(63) Continuation of application No. 17/178,489, filed on Feb. 18, 2021, now Pat. No. 11,533,425.

(30) Foreign Application Priority Data

Feb. 19, 2020 (JP) .................................. 2020-026290

(51) Int. Cl.
*H04N 23/67* (2023.01)
*H04N 23/61* (2023.01)
(Continued)

(52) U.S. Cl.
CPC .......... *H04N 23/675* (2023.01); *H04N 23/61* (2023.01); *H04N 23/62* (2023.01); *H04N 23/631* (2023.01); *H04N 23/695* (2023.01)

(58) Field of Classification Search
CPC ...... H04N 23/675; H04N 23/61; H04N 23/62; H04N 23/631; H04N 23/695; H04N 23/667; H04N 23/632
See application file for complete search history.

(56) References Cited

U.S. PATENT DOCUMENTS 9,253,408 B2 * 2/2016 Tanaka ................. H04N 23/631
9,317,748 B2 * 4/2016 Yoneyama ............. G06T 7/248
(Continued)

FOREIGN PATENT DOCUMENTS

JP 2002-051255 A 2/2002
JP 2006-067452 A 3/2006
(Continued)

OTHER PUBLICATIONS

The foreign documents were cited in the Jan. 25, 2022 Japanese Office Action, which is enclosed without an English Translation, that issued in Japanese Patent Application No. 2020-026290.

*Primary Examiner* — Luong T Nguyen
(74) *Attorney, Agent, or Firm* — Cowan, Liebowitz & Latman, P.C.

(57) ABSTRACT

An image processing apparatus that can easily change the categories of the main object, comprises, an object detection unit for detecting an object categorized as one of at least two categories from an image, a setting unit for setting a first category as a priority category on an object having a predetermined priority among one of the objects detected by the object detection unit; and a region designation unit for designating a predetermined region on an object on a display screen, wherein the setting unit can change the priority category from the first category to a second category different from the first category when the predetermined region of the object designated by the region designation unit is the second category.

18 Claims, 12 Drawing Sheets

(51) Int. Cl.
    *H04N 23/62*     (2023.01)
    *H04N 23/63*     (2023.01)
    *H04N 23/695*     (2023.01)

(56) References Cited

U.S. PATENT DOCUMENTS

| | | | |
|---|---|---|---|
| 9,348,500 B2 * | 5/2016 | Icho | G06F 16/4393 |
| 9,412,008 B2 * | 8/2016 | Yoneyama | G06T 7/248 |
| RE46,834 E * | 5/2018 | Yoshida | H04N 23/635 |
| 11,533,425 B2 * | 12/2022 | Ikeda | H04N 23/631 |
| 2013/0097542 A1 | 4/2013 | Icho et al. | |
| 2013/0242113 A1 | 9/2013 | Tanaka | |
| 2014/0105454 A1 | 4/2014 | Yoneyama | |
| 2015/0138390 A1 | 5/2015 | Tomosada | |
| 2021/0136320 A1 * | 5/2021 | Zatloukal | G06V 20/49 |

FOREIGN PATENT DOCUMENTS

| | | | |
|---|---|---|---|
| JP | 2012-257099 A | 12/2012 | |
| JP | 2014-204249 A | 10/2014 | |
| JP | 2015-034895 A | 2/2015 | |
| JP | 2019-022186 A | 2/2019 | |

* cited by examiner

IMAGE PROCESSING APPARATUS FOR CHANGING A PRIORITY CATEGORY FOR OBJECT DETECTION, IMAGE PICKUP APPARATUS, IMAGE PROCESSING METHOD, AND STORAGE MEDIUM

CROSS-REFERENCE TO RELATED APPLICATIONS

This application is a continuation of application Ser. No. 17/178,489, filed Feb. 18, 2021, the entire disclosure of which is hereby incorporated by reference.

BACKGROUND OF THE INVENTION

Field of the Invention

The present invention relates to an image processing apparatus for detecting an object.

Description of the Related Art

Hitherto, in an image processing device such as a digital camera or an image processing apparatus, it has been possible to have a function of detecting a predetermined object in an image and to control a focus condition or an exposure condition on a priority basis with regard to the detected object.

Japanese Unexamined Patent Application Publication No. 2002-51255 discloses a camera that detects objects in an image, determines a main object that is closest to an image pickup apparatus or largest in a display screen, and controls a focus condition or an exposure condition of the main object.

In recent years, not only human faces but irises, whole body, dogs, cats, birds, or various objects including animals are becoming able to be detected. However, it has accordingly become difficult to select from various objects detected by such detection method to determine the main object as a target object for a photographer.

Therefore, one of ways could be to preset a predetermined category for an object that has priority, by using a setting menu on the display screen and so on.

However, it is troublesome to change them using the setting menu on the display screen when frequently changing categories for the main object.

Thus, one of objects of the present invention is to provide an image processing apparatus that is capable of easily change the categories of the main object without troublesome operation.

SUMMARY OF THE INVENTION

In order to achieve the object, an image processing apparatus according to an aspect of the present invention includes at least one processor or circuit configured to function as:

an object detection unit configured to detect an object categorized as one of at least two categories from an image;

a setting unit configured to set a first category as a priority category on an object having a predetermined priority among one of the objects detected by the object detection unit; and a region designation unit configured to designate a predetermined region on an object on a display screen;

wherein the setting unit is configured to change the priority category from the first category to a second category different from the first category in a case where the predetermined region of the object designated by the region designation unit is the second category.

Further features of the present invention will become apparent from the following description of Embodiments with reference to the attached drawings.

BRIEF DESCRIPTION OF THE DRAWINGS

FIG. 5A illustrates an example of a display screen on the display unit 28 when a priority object setting is "human", FIG. 5B illustrates an example of the display screen when the priority object setting is "human" as shown in FIG. 5A and a user is touching an animal (dog) on the screen. FIG. 5C illustrates an example of the display screen after the user touched the animal (dog) on the screen.

FIG. 11A illustrates an example of the display screen when the priority object setting is "human", FIG. 11B illustrates an example of the display screen when a user presses a first shutter release button 62 to start a focus detection operation.

DESCRIPTION OF THE EMBODIMENTS

Figure 1:
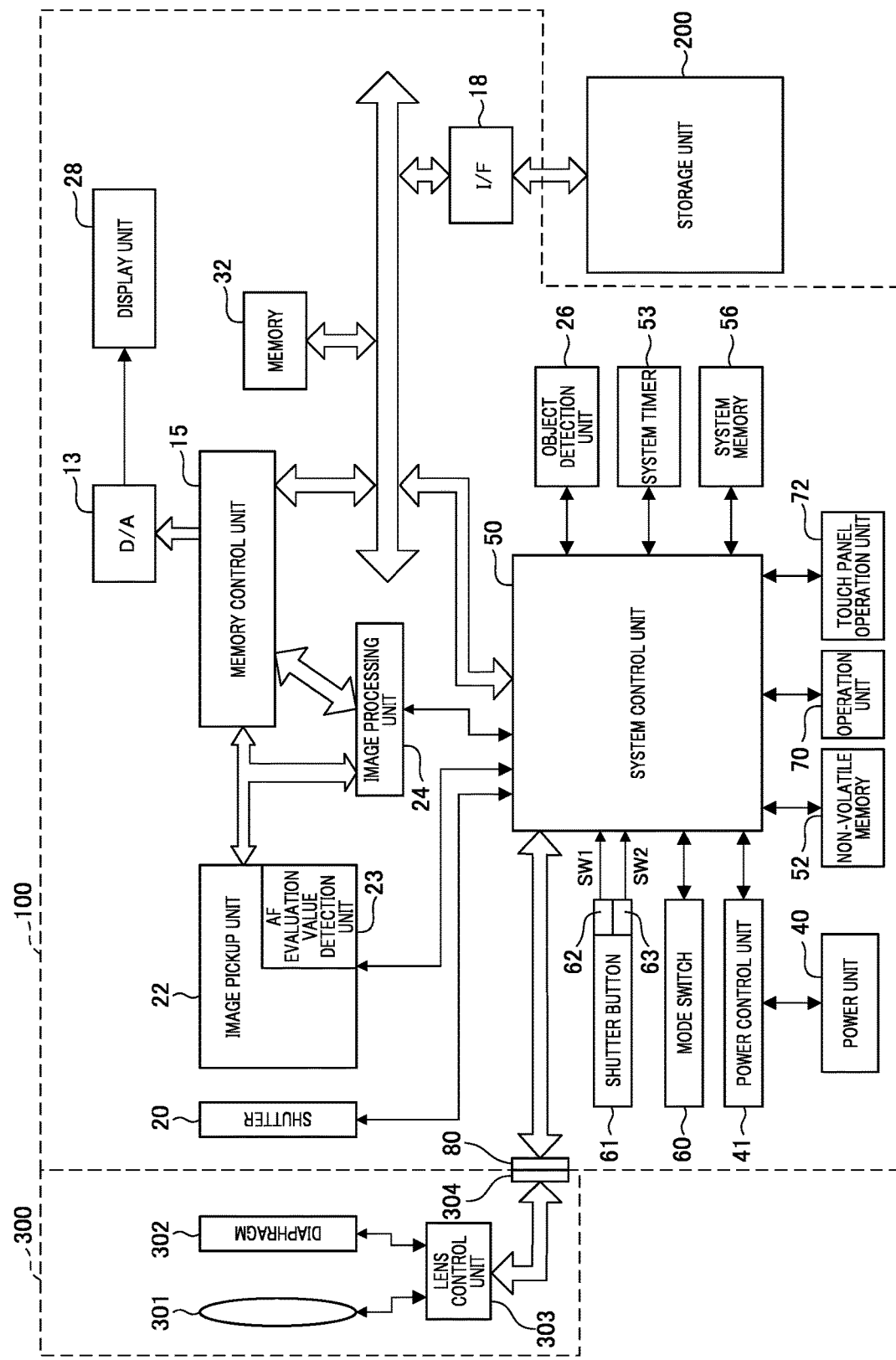
FIG. 1 is a block diagram of an image processing apparatus in Embodiment 1 of the present invention.

Hereinafter, a preferred mode of the present invention will be described using Embodiments with reference to the accompanying drawings. Meanwhile, in the drawings, the same members or components will be denoted by the same reference numerals and signs, and repeated description will be omitted or simplified.

Further, in the Embodiments, an example in which the present invention is applied to a digital (still) camera as an image processing apparatus will be described. However, the image processing apparatuses in the present Embodiments include image processing apparatuses having an imaging function such as a digital movie camera, a smartphone with a camera, a tablet computer with a camera, an on-vehicle camera, a network camera, and so on.

Embodiment 1

FIG. 1 is a block diagram of an image processing apparatus in Embodiment 1 of the present invention.

As illustrated in FIG. 1, the image processing apparatus (an image pickup apparatus) according to Embodiment 1 mainly consists of a digital camera 100 and a lens unit 300 that can be detached from the digital camera 100 as an exchangeable lens.

In the digital camera 100, a shutter 20 controls an exposure period of incident light to an image pickup unit 22.

The image pickup unit 22 includes an image sensor such as a CCD or CMOS or the like for picking up an optical image and for converting it into an electrical signal.

The image pickup unit 22 also includes an A/D conversion processing function and an AF evaluation value detection unit 23. In the AF evaluation value detection unit 23, a contrast signal obtained from a digital image signal and a phase difference signal obtained from a parallax image are calculated to be output to a system control unit 50.

An image processing unit 24 performs a resize process such as a pixel interpolation or a size reduction, and a color conversion process to the image data outputted from the image pickup unit 22 or to the image data obtained from the memory control unit 15.

The image processing unit 24 also obtains distance information to an object based on an AF evaluation value.

That is, the image processing unit 24 detects a phase difference information from inputted two parallax image signals, so that the distance information from the image pickup unit 22 to the object can be obtained pixel by pixel.

In addition, the image processing unit 24 also performs a predetermined calculation process using the image data to obtain exposure control information. The system control unit 50 performs an exposure control and a focus adjustment based on the distance information and the exposure control information. The exposure control includes an TTL (Through the Lens) type AE (Auto Exposure control) and EF (Electronic Flash control).

The image processing unit 24 performs an AF (Auto Focus) process using the distance information. During the process, an output from the AF evaluation value detection unit 23 included in the image pickup unit 22 is used.

The image processing unit 24 also performs a predetermined process using the image data to realize a TTL type AWB (Auto white balance) process.

The image processing unit 24 performs a development/ compression process of a still image and a movie image and performs an extraction of feature values such as color information, luminance information, and so on for tracking the object.

That is, the feature values such as the color information, the luminance information, and so on are extracted from a region of an object image (a reference image or a main object) to be tracked, and then a region whose feature values have the highest correlation with the feature values of the reference image is specified frame by frame, so that the main object can be tracked.

In this way, the image processing unit 24 functions as a tracking unit for tracking the predetermined object base on the color information or the luminance information.

An object detection unit 26 extracts an edge component from the image data by using a band pass filter in a horizontal and a vertical direction. Detected edge components (contour information and so on) are operated by using a pattern matching process, so that parts of faces such as eyes, a nose, a mouth, an ear, and so on are extracted, thereby faces can be detected.

In addition, the object detection unit 26 may perform an object detection by using a machine learning.

In the machine learning, by preparing learning models corresponding to categories of a plurality of objects, objects of various categories can be detected, thereby a specific object such as animals (dogs, cats, birds, or the like) or vehicles and so on can be detected.

That is, the object detection unit 26 detects objects of at least two categories from images obtained by the image pickup unit.

The output data of the image pickup unit 22 is written into the memory 32 via the image processing unit 24 and a memory control unit 15, or the output date from the image pickup unit 22 is directly written into a memory 32 via the memory control unit 15.

The memory 32 stores the image data that is obtained by the image pickup unit 22 and is AD converted, or the image data to be supplied to the display unit 28 so as to function as a video memory for the image display.

The memory 32 has sufficient storage capacity for storing a plurality of still images or a predetermined length of movie and audio data.

A D/A converter 13 converts the digital video data stored in the memory 32 into an analog signal to be supplied to the display unit 28 such as an LCD.

In this way, digital signals AD converted and outputted from the image pickup unit 22 are once stored in the memory 32, and then are DA converted to be supplied to the display unit 28 so that a through image (live view image) is displayed on the display unit, which functions as an electric view finder.

A nonvolatile memory 52 is electrically erasable and storable memory such as a flash memory and so on.

The nonvolatile memory 52 stores operation parameters for the system control unit 50, programs, and so on, wherein the program means computer programs for executing operations illustrated in the following flowcharts of the present Embodiment.

That is, the system control unit 50 includes a CPU as a computer and controls an entire digital camera 100, using the computer programs stored in the nonvolatile memory 52 to perform the operations illustrated in the following flowcharts.

A system timer 53 is used for synchronously controlling each part of the system. The system memory 56 including a RAM is used for expanding the operation parameters, constant values, or programs stored in the nonvolatile memory 52 for the system control unit 50.

A mode switch 60, a shutter release button 61 (including a first shutter release switch 62 and a second shutter release switch 6), an operation unit 70, and a touch panel operation unit 72 are for inputting various kinds of instruction for operation to the system control unit 50.

The mode switch 60 switches operation modes of the system control unit 50 to select one of the operation modes such as a still image photography mode, a movie image photography mode, a play mode, and so on.

The operation modes for still image photography includes an auto photography mode, an auto scene detection mode, a manual mode, a plurality of scene setting mode, a program AE mode, a custom mode, and so on. The mode switch 60 can directly select one of these modes for the still image photography.

Or, the mode switch 60 may switch one of the modes for the still image photography, then another operation unit may be used to determine the mode. Similarly, movie image photography may include a plurality of modes. The first shutter release switch 62 turns on when the shutter release button 61 in the digital camera 100 is half pressed, and produces a first shutter release switch signal SW1.

In response to the first shutter release switch signal SW1, an AF (Auto Focus) process, an AE (Auto Exposure) process, an AWB (Auto White Balance process) an EF (Electronic Flash) process, and so on are started.

A second shutter release switch 63 turns on when the shutter release button 61 is fully pressed and produces a second shutter release switch signal SW2. The system control unit 50 starts a sequence for a still image photography process in response to the second shutter release switch signal SW2, and thereby image signals are read out from the image pickup unit 22 and are stored in a storage unit 200.

The operation unit 70, which includes a plurality of operation members, and the touch panel operation unit 72 can selectively operate a plurality of function icons displayed on the display unit 28, and thereby functions as function buttons. A mouse and so on can be connected to the digital camera 100 so as to function as a part of the operation unit.

The function buttons may include, for example, an end button, a return button, an image skip button, a jump button, a narrowing-down button, an attribute change button, a movie image photograph button, and so on. For example, when the menu button is pressed, a pull-down menu, which includes a plurality of selections, is displayed on the display screen of the display unit 28. Users can select one of the menus displayed on the display screen by operating the mouse, a cross button, a set button, and so on.

In the present Embodiment, by using the touch panel operation unit 72, users can touch an intended object region to designate it.

In that case, the touch panel operation unit 72 functions as a region designation unit for designating an intended object region on the display screen. In this connection, other pointing devices such as a mouse, a cross button, and so on, which are included in the operation unit 70, may be used to designate the intended object region on the display screen. In that case, the pointing devices functions as a region designation unit for designating an intended object region on the display screen.

The menu displayed on the display screen may include a priority object setting for setting a main object having a priority category.

In the priority object setting, when a user sets "human" as the priority object, a human detection region is selected as the main object region on a priority basis by the object detection unit 26, and when the user sets "animal" as the priority object, an animal detection region is selected as the main object region on a priority basis by the object detection unit 26.

The object detection unit 26 detects the main object on a priority basis corresponding to the category set by the priority setting, displays a main object frame on or around the main object, and performs the focus adjustment and the exposure adjustment mainly for the main object.

A power control unit 41 includes a battery voltage detection circuit, a DC-DC converter, a switch circuit for selectively supply power to each circuit, and so on, and detects whether the battery is attached or not, types of the battery, remaining power of the battery, and so on.

The power control unit 41 controls the DC-DC converter based on a result of the detection and instructions from the system control unit 50, and supplies necessary voltage to each circuit including the storage unit 200 for a necessary period.

A power unit 40 includes a primary battery, a secondary battery, an AC adapter, and so on.

A storage unit I/F 18 is an interface for the memory card, the storage unit 200 such as a hard disc, or the like.

The storage unit 200 stores image data and may include, for example, a memory card, a semiconductor memory, a magnetic disc, and so on.

A connector 80 includes electrical contacts for electrically connecting a main body of the digital camera 100 with the lens unit 300.

The connector 80 transmits the control signals, status signals, data signals, and so on between the digital camera 100 and the lens unit 300, and has a function for supplying power from the digital camera 100 to the lens unit 300.

Next, the lens unit 300 will be explained.

The lens unit 300 includes an image pickup lens 301 consisting of a plurality of lenses such as a focus lens that can be shifted along an optical axis direction for focus adjustment and a zoom lens that can be shifted along an optical axis direction for zooming. The lens unit 300 also includes a diaphragm 302 for controlling an aperture to adjust a light amount to the image pickup unit 22 in the digital camera 100.

A lens control unit 303 includes a CPU as a computer and controls an entire lens unit 300 according to control signals from the system control unit 50 in the digital camera 100, and controls driving of the focus lens and the zoom lens of the image pickup lens 301, and the diaphragm 302.

The lens control unit 303 also includes a memory for storing operation parameters, operation constants, computer programs and so on.

The lens control unit 303 also includes a nonvolatile memory that stores ID information such as inherent ID number of the lens unit 300, management information, lens property information such as an open aperture value, a minimum aperture value, a focal length value, an aberration value of distortion, a history of setting values, and so on.

A connector 304 includes electrical contacts for electrically connects the lens unit 300 with the main body of the digital camera 100 and transmits the control signals, status signals, data signals, and so on with the digital camera 100, and has a function for receiving power from the digital camera 100.

Figure 2:
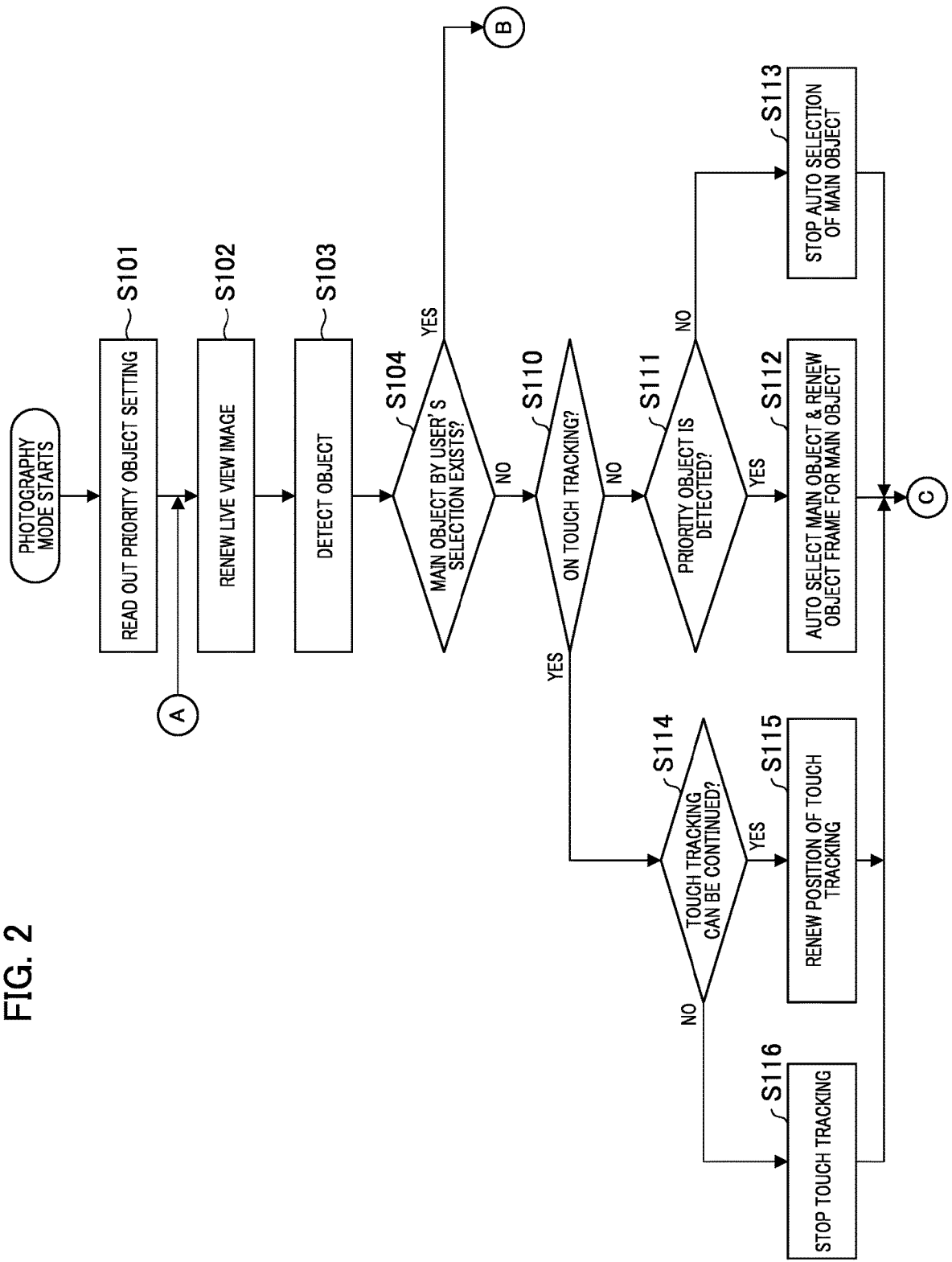
FIG. 2 is a flowchart illustrating an operation of the image processing apparatus in Embodiment 1.
Figure 3:
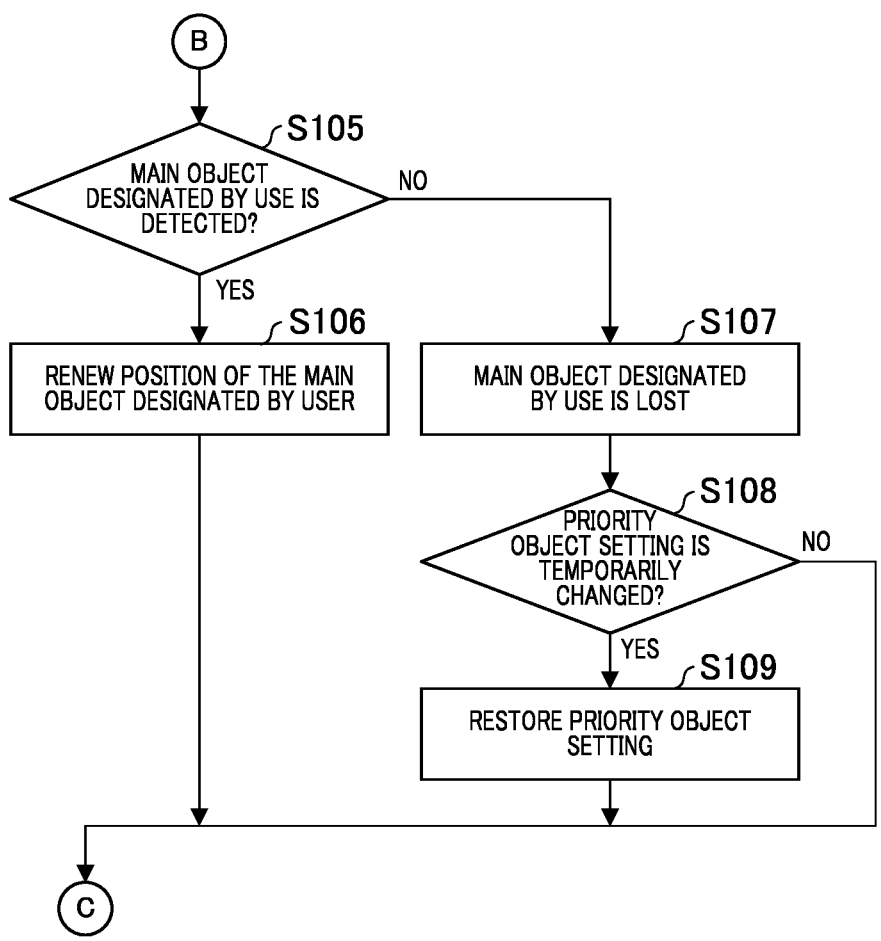
FIG. 3 is a flowchart illustrating another operation of the image processing apparatus in Embodiment 1.
Figure 4:
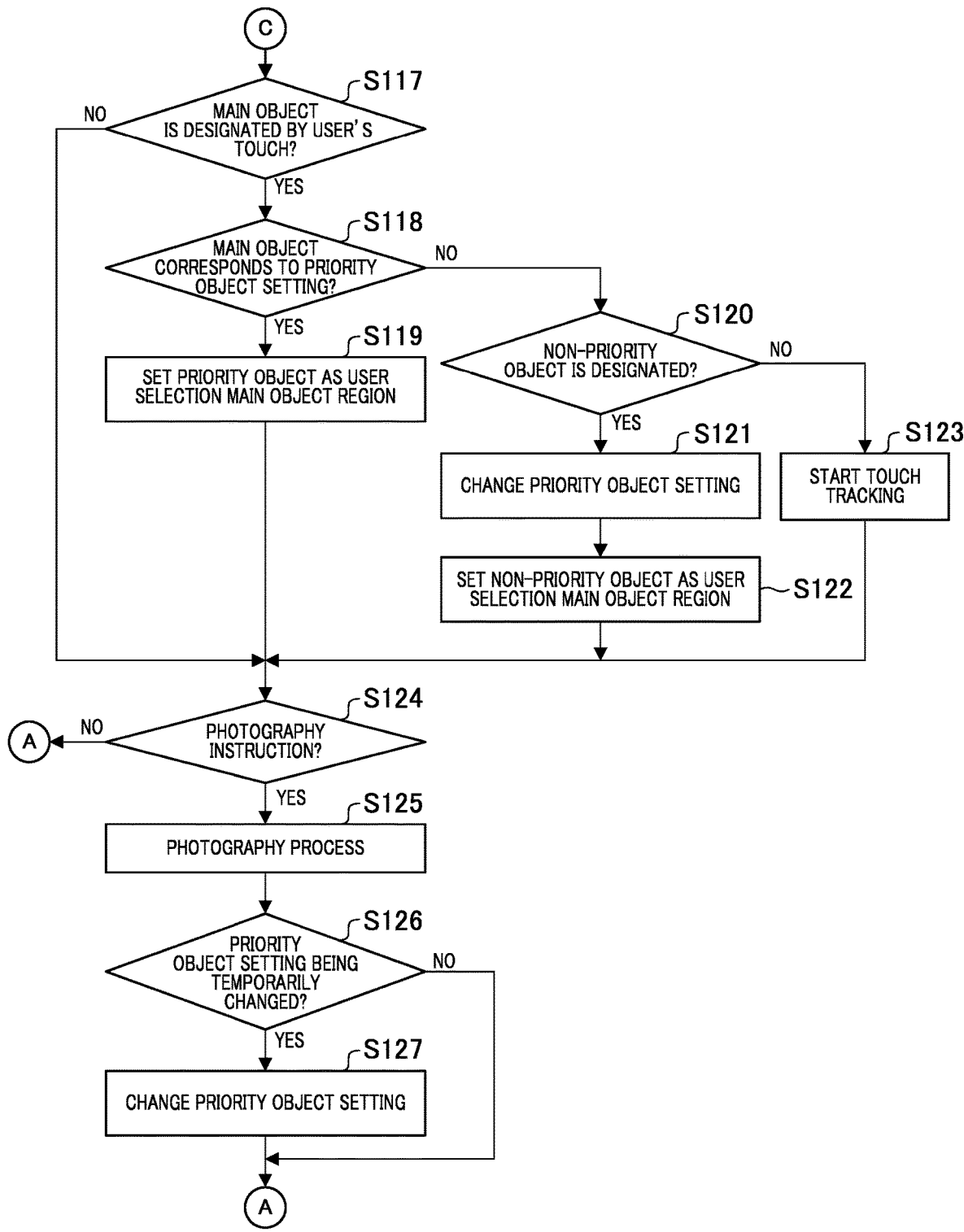
FIG. 4 is a flowchart illustrating further operation of the image processing apparatus in Embodiment 1.

FIG. 2 is a flowchart illustrating an operation of the image processing apparatus in Embodiment 1. FIG. 3 is a flowchart illustrating another operation of the image processing apparatus in Embodiment 1. FIG. 4 is a flowchart illustrating further operation of the image processing apparatus in Embodiment 1.

When a user selects the still image photography mode or the movie image photography mode by operating the mode switch 60, the digital camera 100 starts one of the selected photography modes and thereby starts performing the process illustrated in FIGS. 2 to 4.

The process flows illustrated in FIGS. 2 to 4 are performed by the system control unit 50 by reading out the predetermined computer programs from the nonvolatile memory 52, by expanding the program in the system memory 56, and by controlling operations or processes of each unit included in the digital camera 100.

In a step S101, the system control unit 50 reads out the priority object setting, which was set by a user using the menu selection displayed on the display screen, from the system memory 56, determines a category of the main object, and proceeds to step S102.

As explained in the above, in the priority object setting, users can set the category of the priority object, for example, to a first category using the menu displayed on the display screen, so that objects belonging to the first category are detected as the main objects on a priority basis.

In that case, the system control unit 50 functions as the setting unit for setting the category for the priority object to the first category, so that the object detection unit 26 detects object of the first category among at least two categories on a priority basis.

That is, when objects of the first category are detected by the object detection unit 26, the objects of the first category are automatically recognized as the main object and the focus adjustment and the exposure adjustment for the main objects are performed on a priority basis.

In the process the system control unit 50 functions as the adjusting unit for performing the focus adjustment and/or the exposure adjustment for the main object (priority object).

That is, in a case where a category "human" has been set as the priority object, human regions become main objects on the display screen, and in a case where a category "animal" has been set as the priority object, animal regions become main objects on the display screen.

Although in the present Embodiment, the digital camera 100 can detect objects of two categories such as "human" and "animal", and users can set the priority category from one of the two categories such as "human" and "animal", the digital camera 100 may detect more than two categories.

In a step S102, the system control unit 50 reads out an image signal of one frame from the image pickup unit 22, performs processes such as a white balance adjustment, a pixel interpolation, and so on to the image signal by using the image processing unit 24, and then stores processed image data in the memory 32.

Furthermore, the processed image data, which was processed by the image processing unit 24, is read out from the memory 32, is resized and so on to produce an image data for live view, and is stored again in the memory 32, while being displayed on the display unit 28.

In a step S103, the system control unit 50 reads out the image data generated in the step S102 from the memory 32, thereby the object detection unit 26 detects objects in the image data.

In the present Embodiment, the object detection unit 26 can detect objects of a plurality of categories such as humans, dogs, cats, birds, and so on without regard to the priority object setting.

In addition, the object detection unit 26 can detect a part of them such as faces, bodies, and so on as well.

The object detection unit 26 may be configured to detect only objects of the category set by the priority object setting as described in detail in the Embodiment 2.

In this connection, the object region detected by the object detection unit 26 in the step S103 is dubbed as an object detection region.

In the present Embodiment, although a plurality of object detection regions of different categories detected by the object detection unit 26, main object frames are additionally displayed on the display unit 28 with respect to only objects of the first category, which has been set by the priority object setting.

In this connection, with respect to all the object detection region of different categories detected by the object detection unit 26, marks or frames may be respectively displayed with those objects so that users can recognize which objects are detected.

In the above case where all the object detection regions of different categories detected by the object detection unit 26 are additionally displayed with marks or object frames respectively, the object frames for the main objects of the first category, which has been set by the priority object setting, may be differently displayed from other object frames, for example, by setting color or line width of the object frame for the main objects different from the other objects.

In this way, in the present Embodiment, the display unit 28 functions for differently displaying the object region corresponding to the category set by the priority object setting.

In a step S104, it is determined whether or not any main object region by user's selection exists in previous image frames.

If a result of the determination in the step S104 is "Yes", the process in the system control unit 50 (hereinafter, referred to as the process flow) proceeds to a step S105 in FIG. 3.

If the result of the determination in the step S104 is "No", the process flow proceeds to a step S110 in FIG. 2.

In this connection, the "main object region by user's selection" means that the main object region selected, for example, by user's touch operation on an intended position of an object detection region on the display screen and so on in order to set an intended object as the main object region by the user.

In a step S110, it is determined whether the touch tracking is being carried out or not, wherein the "touch tracking" means a tracking operation that is started in response to user's touch operation on an intended object on the display screen, in which a touched object is set as the main object region to be tracked, and that is described in detail with regard to a step S123.

If it is determined in the step S110 that the "touch tracking" is not being carried out ("No" in the step S110), the process flow proceeds to a step S111, and if it is determined in the step S110 that the "touch tracking" is being carried out ("Yes" in the step S110), the process flow proceeds to a step S114.

In the step S111, it is determined whether or not the object whose category is the same as the category set by the priority object setting is detected in the object detection performed in the step S103.

That is, if "human" is set in the priority object setting, it is determined in the step S111 whether a human is detected or not, and if "animal" is set in the priority object setting, it is determined in the step S111 whether an animal is detected or not.

If it is determined in the step S111 that objects of the category set in the priority object setting are detected ("Yes" in the step S111), the process flow proceeds to a step S112.

If it is determined in the step S111 that objects of the category set in the priority object setting are not detected ("No" in the step S111), the process flow proceeds to a step S113.

In the step S112, the main object region is selected based on a result of the object detection in the step S103 and the position and the size of the main object region are renewed.

In addition, the position and size of the object frame, which is displayed on the display screen of the display unit 28 in an automatic selection condition for indicating the main object region, are also renewed.

In the step S113, since it is determined in the step S111 that objects of the category set in the priority object setting are not detected, the position and the size of the main object region are reset to 0, and the object frame for indicating the main object region in the automatic selection condition is renewed to disappear.

A process flow from the step S111 to the step S113 corresponds to an automatic selection process by the digital camera 100 for the main object and thereby objects whose category is set in the priority object setting are automatically selected and the object frames for indicating the main object regions are displayed.

On the contrary, in the step S114, the system control unit 50 determines whether the "touch tracking" started in the step S123 can be continued or not.

In this regard, the feature values such as the color information, the luminance information, and so on extracted from the reference image (the main object region in a previous image frame) by the image processing unit 24 are compared with the feature values extracted from the main object region in a current image frame, and the system control unit 50 determines that the touch tracking started in the step S123 can be continued if the difference between them is smaller than a predetermined value.

If the system control unit 50 determines that the touch tracking started in the step S123 can be continued ("Yes" in the step S114), the process flow proceeds to a step S115, while if the system control unit 50 determines that the touch tracking started in the step S123 cannot be continued ("No" in the step S114), the process flow proceeds to a step S116.

In the step S115, based on the feature values such as the color information, the luminance information, and so on extracted from the reference image (the main object region in a previous image frame) by the image processing unit 24, the position and the size of the main object region, which is being tracked by the "touch tracking", are renewed.

In addition, the position and the size of the object frame for indicating the main object region, which is displayed on the display screen of the display unit 28, are also renewed, and the process flow proceeds to a step S117 in FIG. 4.

In the step S116, the system control unit 50 stops the "touch tracking", resets the position and the size of the main object region to 0, renews the object frame for indicating the main object region in the automatic selection condition to disappear, and proceeds to the step S117 in FIG. 4.

As mentioned in the above, when the result of the determination in the step S104 is "Yes", the process flow proceeds to the step S105 in FIG. 3.

In the step S105, it is determined whether the main object designated in a step S119 or a step S122 by user's touch on the display screen in previous image frames is detected in the current image frame by the object detection process in the step S103.

If it is determined that the main object designated by user's touch on the display screen in previous image frames is detected in the current image frame by the object detection process ("Yes" in the step S105), the process flow proceeds to a step S106.

On the contrary, if it is determined that the object of the main object region designated by user's touch on the display screen in previous image frames is not detected in the current image frame by the object detection process ("No" in the step S105), the process flow proceeds to a step S107.

In the step S106, based on a result of the object detection in the step S103, the position and the size of the main object region, which is designated by user's touch on the display screen and so on, are renewed.

In addition, the position and the size of the object frame for indicating the main object region, which is displayed on the display screen of the display unit 28, are also renewed, and the process flow proceeds to the step S117 in FIG. 4.

In the step S107, it is determined that the main object designated by the user's touch on the display screen is lost, the position and the size of the main object region are reset to 0, and the object frame for indicating the main object region is renewed to disappear, and the process flow proceeds to a step S108.

In the step S108, it is determined whether the priority object setting has been temporarily changed in a step S121 in previous image frames or not.

If it is determined that the priority object setting has been temporarily changed ("Yes" in the step S108), the process flow proceeds to a step S109, and if it is determined that the priority object setting has not been temporarily changed ("No" in the step S108), the process flow proceeds to the step S117 in FIG. 4.

In a step S109, the system control unit 50 reads out the priority object setting, which has been temporarily set in the step S121 in previous image frames and which was saved in the system memory 56, restores the priority object setting set in the step S121, and proceeds to the step S117 in FIG. 4.

That is, in the step S109, in a case where the category of the priority object is changed to the second category, for example, by user's touch on the display screen, and if the main object of the second category is lost, then the category of the priority object of the priority object setting is restored to the first category.

In the step S117 in FIG. 4, it is determined whether an intended main object is designated by user's touch on the display screen or not.

If it is determined that the intended main object is designated by user's touch on the display screen ("Yes" in the step S117), the process flow proceeds to a step S118, and if it is determined that the intended main object is not designated by user's touch on the display screen ("No" in the step S117), the process flow proceeds to a step S124.

In the step S118, it is determined whether or not the object region whose category is the same as the category (the first category) set by the priority object setting is designated by user's touch and so on from objects of plurality of categories detected in the object detection in the step S103.

That is, for example, if the priority object setting is "human", it is determined whether or not the human detection region is designated by user's touch on the display screen and so on, and if the priority object setting is "animal", it is determined whether or not the animal detection region is designated by user's touch on the display screen and so on.

If it is determined that the object region whose category is the same as the category (the first category) set by the priority object setting is designated by user's touch and so on ("Yes" in the step S118), the process flow proceeds to the step S119.

That is, if the priority object setting is "human", and if it is determined that the human detection region is designated by user's touch on the display screen and so on, or if the priority object setting is "animal", and if it is determined that the animal detection region is designated by user's touch on the display screen and so on, then the process flow proceeds to the step S119.

On the contrary, if it is determined that the object region whose category is the same as the category (the first category) set by the priority object setting is not designated by user's touch and so on ("No" in the step S118), the process flow proceeds to a step S120.

That is, for example, if the priority object setting is "human", and if it is determined that the human detection region is not designated by user's touch on the display screen and so on, or if the priority object setting is "animal", and if it is determined that the animal detection region is not designated by user's touch on the display screen and so on, then the process flow proceeds to the step S120.

In the step S119, an object detection region of the object designated by user's touch on the display screen and so on, of which category is the same as the category set by the priority object setting, is determined as a "user selection main object region", and the process flow proceeds to the step S124.

In this connection, in a case where the user designates the main object by touching the object on the display screen and so on, it is made more difficult to change the main object region to the other detection region than in a case where the main object region is selected by the automatic selection, whose process was illustrated in the step S111 to the step S113.

This is because that since a user intentionally designates the main object region by touching the display screen and so on, considering user's intention, the main object designated by the user should be maintained for a longer period.

In the step S120, it is determined whether or not the category of the object detection region designated by the user's touch on the display screen and so on, which is among object detection regions detected in the step S103, is different from the category set in the priority object setting.

That is, for example, if the priority object setting is "human", it is determined whether or not the category of the object detection region designated by the user's touch on the display screen and so on, is "animal" or a category other than "human", or if the priority object setting is "animal", it is determined whether or not the category of the object detection region designated by the user's touch and so on, is "human" or a category other than "animal".

If it is determined that the category (the second category) of the object detection region designated by the user's touch on the display screen and so on is different from the category (the first category) set in the priority object setting ("Yes" in the step S120), the process flow proceeds to the step S121.

That is, if the priority object setting is "human", and if it is determined that the category of the object detection region designated by the user's touch on the display screen and so on, is "animal" or a category other than "human", the process flow proceeds to the step S121.

Or, if the priority object setting is "animal", and if it is determined that the category of the object detection region designated by the user's touch and so on, is "human" or a category other than "animal", the process flow proceeds to the step S121.

On the contrary, if it is determined that the category of the object detection region designated by the user's touch on the display screen and so on is not different from the category set in the priority object setting ("No" in the step S120), the process flow proceeds to the step S123.

That is, if the category of the object detection region designated by the user's touch on the display screen and so on is not an animal nor a human despite the category set in the priority object setting, the process flow proceeds to the step S123.

Or, if the object detection region designated by the user's touch on the display screen and so on is not the objects detection regions detected in the step S103, which means that the touched position is not the object positions detected in the step S103, the process flow proceeds to the step S123.

In the step S121, the system control unit 50 temporarily saves the category (the first category), which was set in advance in the priority object setting, in a predetermined region in the system memory 56, and changes category (the first category) set by the priority object setting to the category (the second category) corresponding to the object designated by user's touch on the display screen and so on.

That is, if the priority object setting is "human", and if an animal is designated by touching the display screen and so on, the setting of "human" is saved and the priority object setting is temporarily changed to "animal".

And, if the priority object setting is "animal", and if a human is designated by touching the display screen and so on, the setting of "animal" is saved and the priority object setting is temporarily changed to "human".

In the step S122, the object detection region designated by user's touch on the display screen and so on is indicated as the "user selection main object region" by using the main object frame, and the process flow proceeds to the step S124.

That is, the object detection region corresponding to the objects whose category is temporarily changed in the step S121 is regarded as the main object region and is made an "arbitral selection condition", and the process flow proceeds to the step S124.

In step S123, the image data of the object region designated by user's touch on the display screen is set as a reference image by the image processing unit 24, and the "touch tracking", which is the tracking of the main object designated by user's touch on the display screen and so on, is started based on the feature values such as the color information and the luminance information and so on extracted from the image data of the object region, then the process flow proceeds to the step S124.

In this regard, the touch tracking means the tracking of the main object which is designated by user's touch on the display screen and so on, and whose category does not exist in the menu on the display screen, wherein the touch tracking is performed by the image processing unit 24.

In the step S124, it is determined whether or not a photography operation is instructed by user's pressing of the shutter release button 61 or an operation of the movie image taking button in the operation unit 70.

If it is determined that the photography operation is instructed ("Yes" in the step S124), the process flow proceeds to the step S125.

On the contrary, if it is determined that the photography operation is not instructed ("No" in the step S124), the process flow returns to the step S102 and starts processing a next image frame.

In the step S125, a photographing process for a still image or a movie image is performed.

In the photographing process, the system control unit 50 reads out the image data captured by the image pickup unit 22, controls the image processing unit 24 to process the image data so as to be developed and compressed, and stores the processed image data in the storage unit 200 via the I/F 18.

In a step S126, it is determined whether the priority object setting has been temporarily changed or not in the step S121.

If "Yes" in the step S126, the process flow proceeds to a step S127 and if "No" in the step S126, the process flow returns to the step S102 and starts processing a next image frame.

In the step S127, previous priority object setting (the first category) temporarily saved in the predetermined region of the system memory 56 in the step S121 is discarded and the priority object setting (the second category), to which the setting has been temporarily changed, is set as an initial value.

That is, the category of the priority object in the following image frames is determined based on the initial value, then the process flow returns to the step S102 and starts processing the next image frame.

Then, referring to FIG. 5, the display screen of the display unit 28 and the object frames of the main object regions according to Embodiment 1 will be described.

Figure 5A:
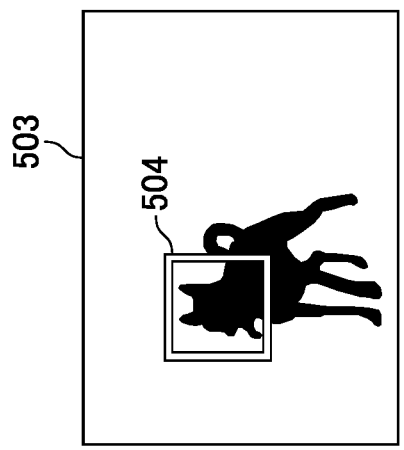
FIGS. 5A, 5B, and 5C are diagrams illustrating examples of a display screen in Embodiment 1.
Figure 5B:
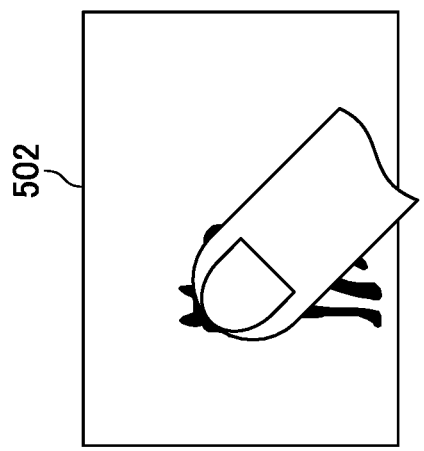
Figure 5C:
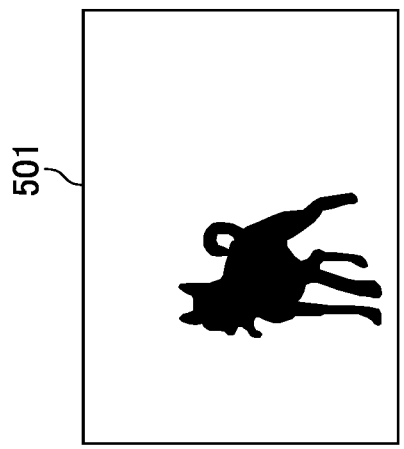

FIGS. 5A, 5B, and 5C are diagrams illustrating examples of a display screen in Embodiment 1. FIG. 5A illustrates an example of the display screen when the priority object setting is "human", FIG. 5B illustrates an example of the display screen when the priority object setting is "human" as shown in FIG. 5A and a user is touching an animal (dog) on the screen. FIG. 5C illustrates an example of the display screen after the user touched an animal (dog) on the screen.

In FIG. 5A, 501 denotes a display screen on the display unit 28 when the priority object setting is "human".

Since the priority object setting is "human", when it is determined whether a human is detected or not in the step S111. Then, if a human is not detected in FIG. 5A, the object frame for indicating the main object is not displayed on the display screen 501 in the step S113 as shown in FIG. 5A.

Then, in FIG. 5B, it is illustrated that an animal (a dog) is designated by user's touch on the display screen 502 after a display state in FIG. 5A.

In FIG. 5C, 503 denotes a display screen on the display unit 28 after a display state in FIG. 5B.

Since the category ("animal") of the object detection region touched by a user in FIG. 5B is different from the category ("human") set by the priority object setting, the priority object setting is temporarily changed from "human" to "animal" in the step S121, and the object frame 504 indicating the "user selection main object" is displayed on the object detection region of the dog in the step S122.

In addition, the focus adjustment and the exposure adjustment are performed on a priority basis for the image in the main object frame As explained in the above, the system control unit 50 functions as a setting unit for setting a first category as a priority category on an object having a predetermined priority among objects detected by the object detection unit by using, for example, the menu on the display screen and so on.

In addition, the system control unit 50 changes the priority category from the first category to a second category different from the first category in a case where an intended object region of the object is designated, for example, by user's touch on the display screen and so on, and in a case where the category of the intended object region is the second category.

Thus, without troublesome operations such as opening a setting menu on the display screen each time when changing the category for the main object, the category of the priority object setting can be quickly changed during displaying the live view images, so that the category of an intended main object can be easily and smoothly changed.

In addition, in a case where the main object whose category was temporarily changed to the second category is lost in the image, then previous category (the first category) of the priority object setting can be easily restored.

Embodiment 2

Hereinafter, the Embodiment 2 will be described.

Although in Embodiment 1, in a case where an intended object whose category (the second category) is different from the category (the first category) set by the priority object setting is touched on the display screen, the category (the first category) of the priority object setting is temporarily changed to a different category (the second category), so that the intended object of the second category is temporarily set as the main object. In addition, if the intended object of the second category is lost on the display screen, then previous category (the first category) of the priority object setting is restored.

Contrary to the Embodiment 1, in Embodiment 2, if the intended object of the second category, which was temporarily changed, is lost on the display screen, tracking operation is started based on feature values such as the color information and the luminance information and so on of the object region in a previous object detection position and if the tracking cannot be continued, then the category (the second category) of the priority object setting is changed to the previous setting.

By this way, in a case where an intended object whose category is different from the category set in the priority object setting is designated by user's touch on the display screen, the intended object can be temporarily set as the main object, by changing the category of the priority object setting, for a longer period than in Embodiment 1.

Figure 6:
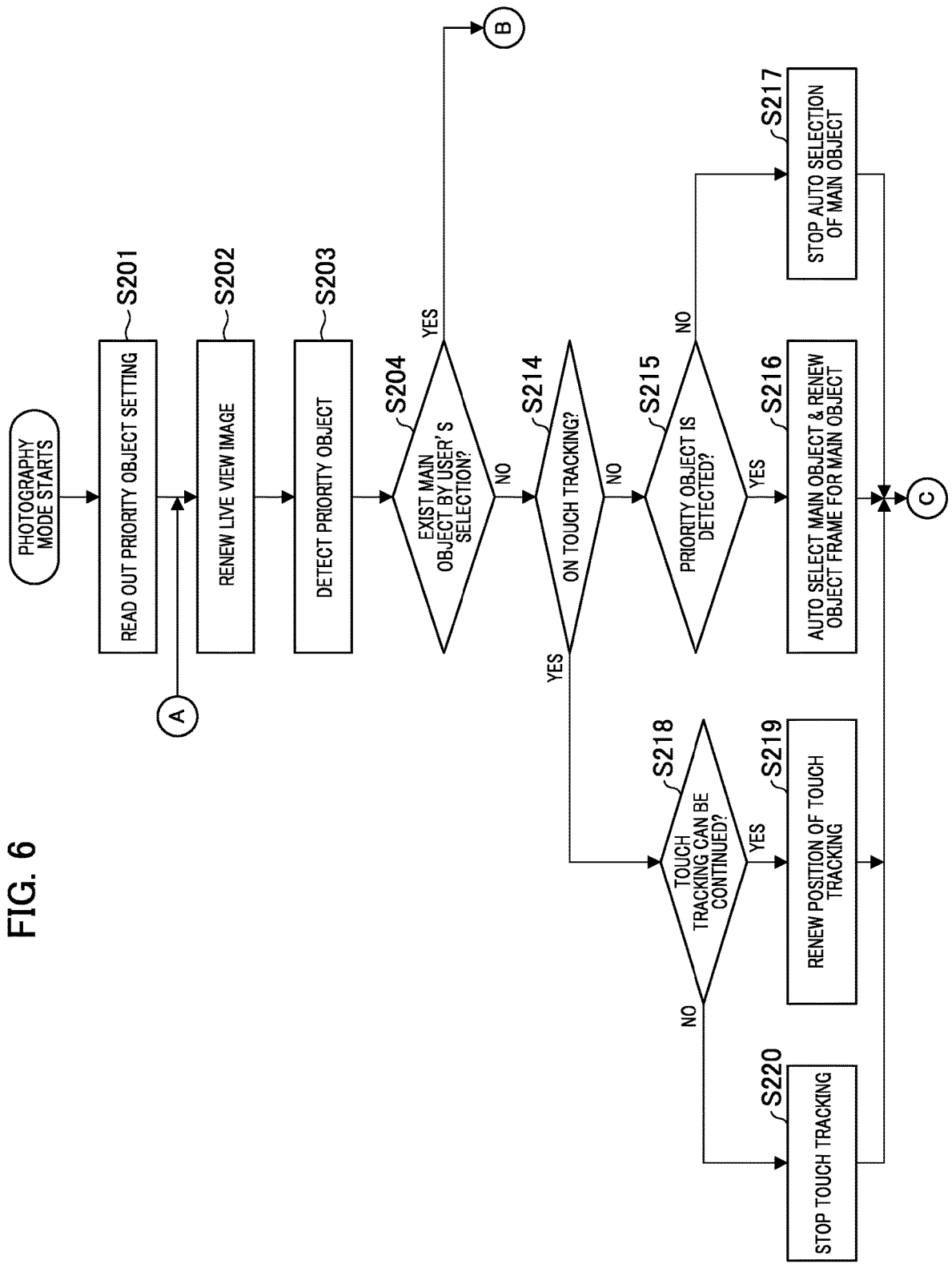
FIG. 6 is a flowchart illustrating an operation of the image processing apparatus in Embodiment 2.
Figure 7:
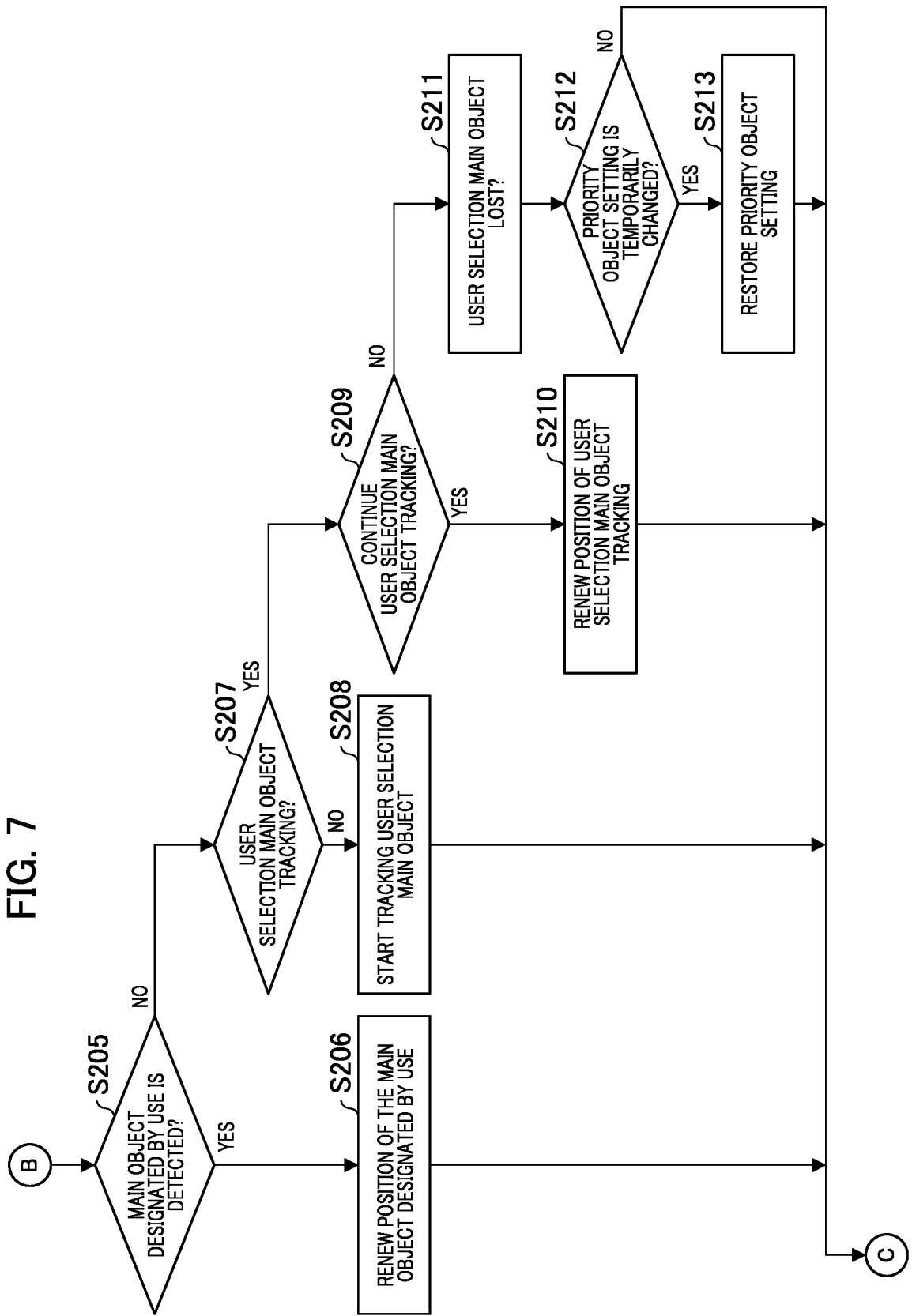
FIG. 7 is a flowchart illustrating another operation of the image processing apparatus in Embodiment 2.
Figure 8:
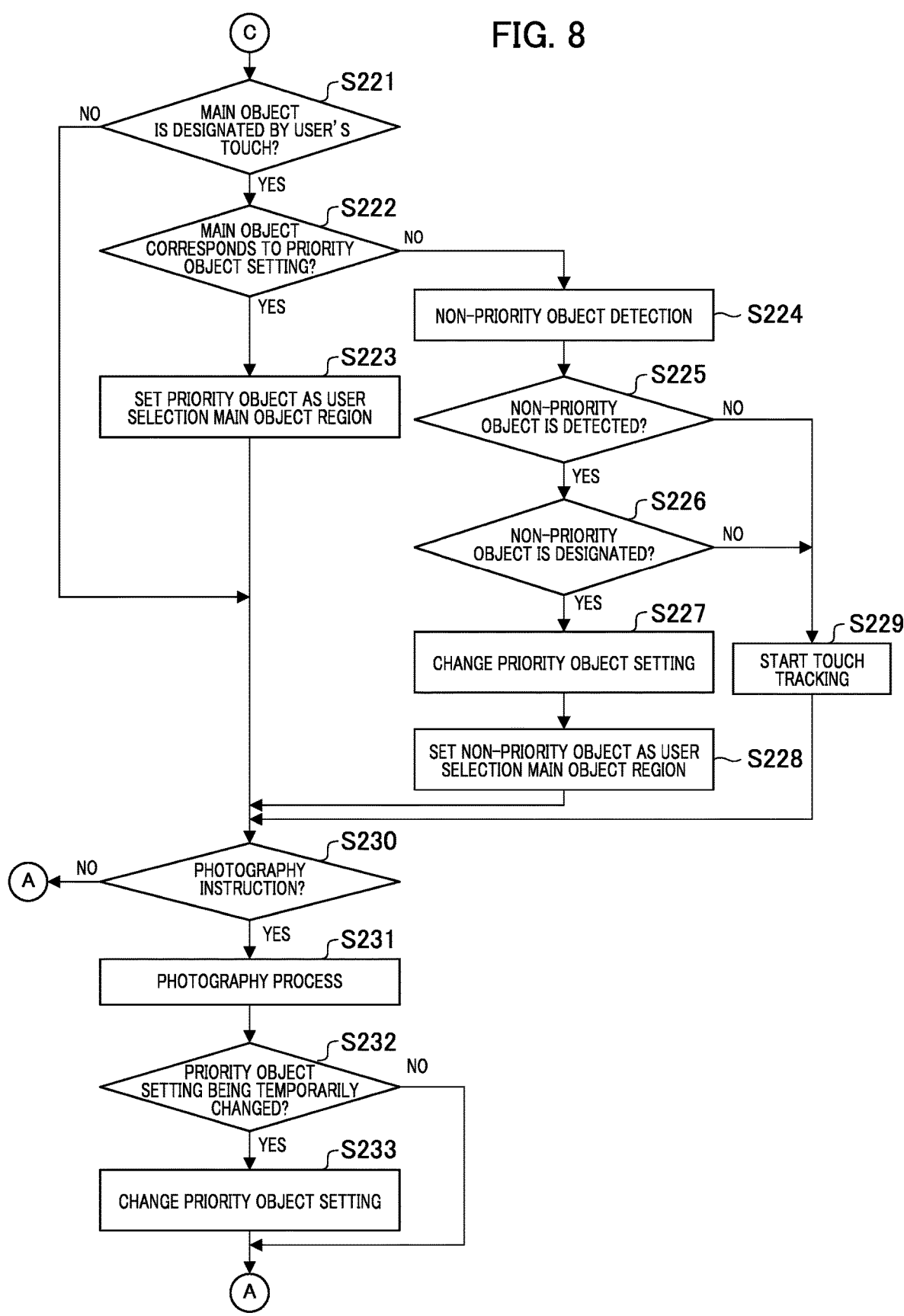
FIG. 8 is a flowchart illustrating further operation of the image processing apparatus in Embodiment 2.

FIG. 6 is a flowchart illustrating an operation of the image processing apparatus in Embodiment 2. FIG. 7 is a flowchart illustrating another operation of the image processing apparatus in Embodiment 2. FIG. 8 is a flowchart illustrating further operation of the image processing apparatus in Embodiment 2. In each drawing, the same reference numerals are given to the same processes and repeated description will be omitted.

When a user selects the still image photography mode or the movie image photography mode by using the mode switch 60, the digital camera 100 starts the photography mode and processes in FIG. 6 are performed.

The process flows illustrated in FIGS. 6 to 8 are performed by the system control unit 50 by reading out the predetermined programs from the nonvolatile memory 52, by expanding the program in the system memory 56, and by controlling operations or processes of each unit included in the digital camera 100.

Steps S201 to S202 are respectively the same as the steps S101 to S102 in Embodiment 1, so that repeated descriptions of them will be omitted.

In a step S203, a live image data generated in the step S202 is read out from the memory 32, is processed by the object detection to detect objects, and then the process flow proceeds to a step S204.

At that time, objects whose category is set by the priority object setting in the object detection unit 26 is exclusively detected.

For example, if the priority object setting is "human", humans are exclusively detected, and if the priority object setting is "animal", animals are exclusively detected in Embodiment 2, in contrast to Embodiment 1, wherein objects of a plurality of detectable categories are detected despite the priority object setting.

Therefore, the digital camera 100 according to Embodiment 2 can reduce processing loads and power consumption, and can use the object detection unit 26 that cannot detect a plurality of categories at the same time.

Steps S204 to S206 are respectively the same as the steps S104 to S106 in Embodiment 1, so that repeated description of them will be omitted.

In a step S207, it is determined whether the "user selection main object tracking" has been performed in a previous image frame or not, wherein the "user selection main object tracking" means a tracking operation that starts tracking in a step S208, which will be described below, by using the "user selection main object region" as a reference image.

If "No" in the step S207, the process flow proceeds to the step S208, and if "Yes" in the step S207, the process flow proceeds to a step S209.

In the step S208, since the "user selection main object" is not detected in the step S205, the "user selection main object region" that has been detected immediately before a current image frame is set as the reference image, so that the "user selection main object tracking" is started using the reference image, and the process flow proceeds to a step S221.

In a step S209, it is determined whether the "user selection main object tracking", which has been started immediately before the current image frame, can be continued or not.

In this regard, the determination whether or not the "user selection main object tracking" can be continued is performed based on whether or not there is a correlation more than a predetermined value between the feature value such as the color information and the luminance information and so on extracted from the image data of the "user selection main object", which is set as the reference image data by the image processing unit 24, and the feature value extracted from the current image frame.

If it is determined that the "user selection main object tracking" can be continued ("Yes" in the step S209), the process flow proceeds to a step S210, and if it is determined that the "user selection main object tracking" cannot be continued ("No" in the step S209), the process flow proceeds to a step S211.

In step S210, the position and the size of the "user selection main object region" during the "user selection main object tracking" is renewed based on the feature values such as the color information and the luminance information and so on extracted from the image data by the image processing unit 24.

In addition, the position and the size of the object frame displayed on the display screen for indicating the main object region during the "user selection main object tracking" is renewed, and the process flow proceeds to a step S221.

Steps S211 to S223 are respectively the same as the steps S107 to S119 in Embodiment 1, so that repeated description of them will be omitted.

In a step S224 in FIG. 8, as the live view image data generated in the step S202 is read out from the memory 32, the object detection unit 26 starts performing a "non-priority object detection", in which objects of the category (the second category) that is different from the category (the first category) set in advance by the priority object setting is detected, and the process flow proceeds to a step S225.

That is, for example, if the priority object setting is "human", detection of objects of the category such as "animal" or other category different from "human" is started, and if the priority object setting is "animal", detection of objects of the category such as "human" or other category different from "animal" is started.

In the step S225, it is determined whether a non-priority object is detected or not in the "non-priority object detection" performed in the step S224.

That is, if the priority object setting is "human", it is determined whether or not objects of the category such as "animal" or other category different from "human" is detected, and if the priority object setting is "animal", it is determined whether or not objects of the category such as "human" or other category different from "animal" is detected.

If it is determined that the non-priority object is detected ("Yes" in the step S225), the process flow proceeds to a step S226. That is, if the priority object setting is "human", and if it is determined that objects of the category such as "animal" or other category different from "human" is detected, the process flow proceeds to a step S226.

And if the priority object setting is "animal", and if it is determined that objects of the category such as "human" or other category different from "animal" is detected, the process flow proceeds to a step S226.

On the contrary, if it is determined that the non-priority object is not detected ("No" in the step S225), the process flow proceeds to a step S229.

In the step S226, it is determined whether or not an object detection region of the non-priority object, whose category is not the first category, is designated by user's touch on the display screen and so on.

That is, if the priority object setting is "human", it is determined whether or not objects of the category such as "animal" or other category different from "human" is detected, and if the priority object setting is "animal", it is determined whether or not objects of the category such as "human" or other category different from "animal" is detected.

Steps S227 to S233 are respectively the same as the steps S121 to S127 in Embodiment 1, so that repeated description of them will be omitted.

Thus, also in Embodiment 2, when a user wants to set an intended object, of which category is different from the category set by the priority object setting, as the main object, the category of the intended object can be quickly changed by temporarily changing the priority object setting in response to user's touch on the intended object displayed on the display screen. Therefore, the intended object can be easily changed to the main object.

Therefore, without troublesome operations such as opening a setting menu on the display screen each time when changing the category for the main object, the category of the priority object setting can be quickly changed during displaying the live view images, so that the category of an intended object can be easily changed to the main object.

In addition, in Embodiment 2, if the intended object of the second category, which was temporarily changed, is lost on the display screen, since tracking operation is started based on feature values such as the color information and the luminance information and so on, the intended object can be maintained as the main object for a longer period than in Embodiment 1.

Furthermore, by automatically restoring the previous setting if continue tracking cannot be continued, the priority object setting can be easily changed to the previous setting.

In addition, since objects whose category (the first category) is the same as the category (the first category) set by the priority object setting in the object detection unit 26 is exclusively detected, the digital camera 100 according to Embodiment 2 can reduce processing loads and power consumption, and can use the object detection unit 26 that cannot detect a plurality of categories at the same time.

Embodiment 3

Hereinafter, the image processing apparatus according to Embodiment 3 will be described.

In Embodiment 1 and Embodiment 2, when the non-priority object is touched on the display screen touch and so on, the priority object setting is temporarily changed, so that the main object can be changed.

In contrast, in the present Embodiment 3, by setting a focus detection frame corresponding to a focus detection region on the non-priority object and by pressing the first shutter release switch 62 to start the focus detection, the priority object setting is changed, and the non-priority object can be set as the main object.

By this way, like Embodiment 1 and Embodiment 2, without troublesome operations such as opening a setting menu on the display screen each time when changing the category for the main object, the category of the priority object setting can be quickly changed during displaying the live view images, so that the category of an intended object can be easily changed to the main object.

In addition, when pressing of the first shutter release switch 62 is stopped, the temporarily changed priority object setting is restored.

Figure 9:
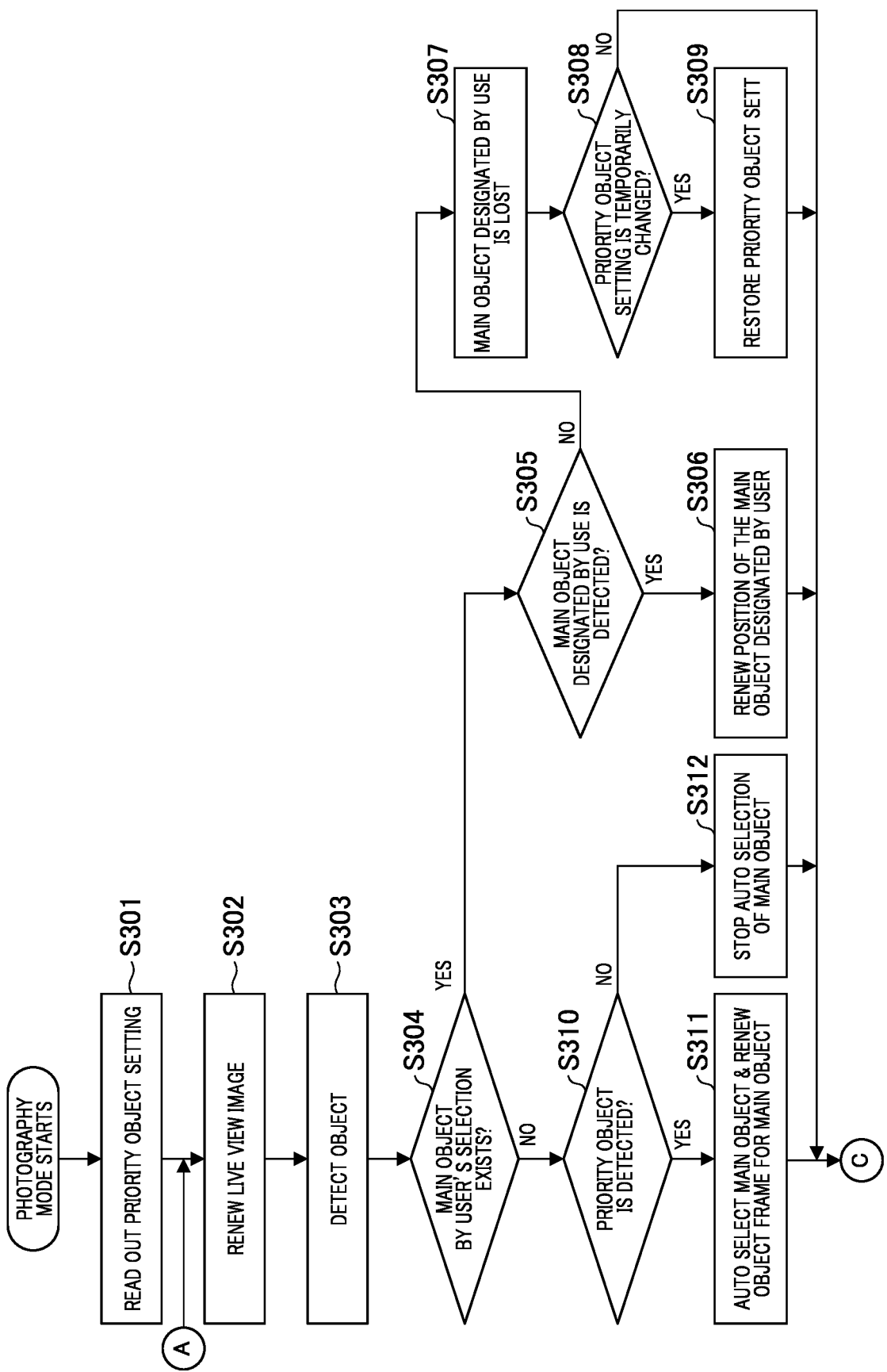
FIG. 9 is a flowchart illustrating an operation of the image processing apparatus in Embodiment 3.
Figure 10:
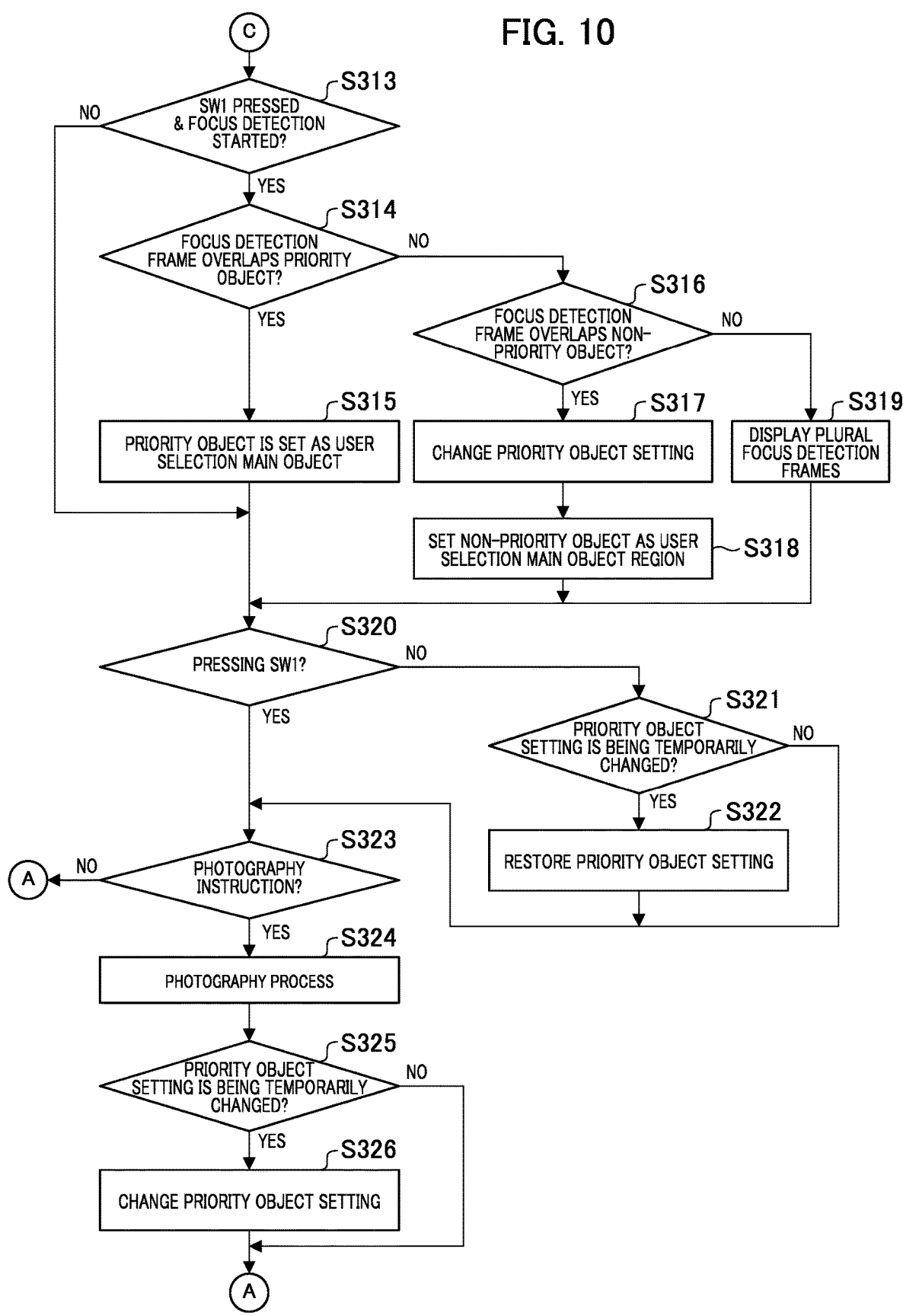
FIG. 10 is a flowchart illustrating another operation of the image processing apparatus in Embodiment 3.

FIGS. 9 and 10 are flowcharts illustrating operations of the image processing apparatus in Embodiment 3.

When a user selects one of the still image photography mode and the movie image photography mode by using the mode switch 60, the digital camera 100 stars the photography mode and processes in FIG. 9 are executed.

The process flows illustrated in FIGS. 9 and 10 are performed by the system control unit 50 by reading out the predetermined programs from the nonvolatile memory 52, by expanding the program in the system memory 56, and by controlling operations or processes of each unit included in the digital camera 100.

In a step S301, the priority object setting set in advance by the user is read out from the system memory 56, so that the category of the main object is determined, then the process flow proceeds to a step S302.

As to the priority object setting, refer to the previous explanation in Embodiment 1.

In a step S302, image data is read out from the image pickup unit 22, then is processed in the image processing unit 24, so that image data processed by the white balance process and pixel interpolation process and so on is generated and stored in the memory 32.

Subsequently, the image data processed by the image processing unit 24 is read out from the memory 32 and is resized and so on to be converted into image data for live view.

Then, the image data is written into the memory 32 while being supplied to the display unit 28, so that the live view images are renewed, and then the process flow proceeds to a step 303.

In the step S303, the image data generated in the step 302 is read out from the memory 32, then is processed for detecting objects by the object detection unit 26.

In this regard, despite the priority object setting in the object detection unit 26, objects of all the detectable category are detected, so that humans, animals such as dogs, cats, or birds, and faces or body of them can be detected.

In the step S304, it is determined whether or not there is a main object region designated by user's touch on the display screen and so on. If it is determined that there is a main object region designated by user's touch on the display screen and so on ("Yes" in the step S304), the process flow proceeds to a step S305.

On the contrary, if it is determined that there is not a main object region designated by user's touch on the display screen and so on ("No" in the step S304), the process flow proceeds to a step S310.

In this regard, it is determined that there is a main object region designated by user's touch on the display screen and so on, when a user designates a main object region by setting a focus detection frame corresponding to a focus detection region on the non-priority object and starts the focus detection, which will be explained below with regard to steps S315 and S318.

In this way, in Embodiment 2, an object region is designate by setting the focus detection region on the display screen.

In a case where the user directly designates the main object on the display screen, the main object region is not as easily changed to the other detection regions as in an automatic selection mode, where the digital camera 100 automatically selects the main object region, so that the same main object region can be maintained for a longer period in consideration of user's intention.

The automatic selection mode will be explained below with respect to steps S310 to S312, In the step S305, it is determined whether the object designated by user's touch on the display screen has been detected in the object detection in the step S303 or not. And, if "Yes" in the step S305, the process flow proceeds to a step S306 and if "No" in the step S305, the process flow proceeds to a step S307.

In the step S306, based on a result of object detection in the step S303, the position and the size of the main object region that is designated by user's direct touch on the display screen are renewed.

In addition, the position and the size of the object frame displayed on the display screen for indicating the main object region that is designated by user's direct touch on the display screen are also renewed.

In the step S307, as it is determined that the main object designated by user's direct touch on the display screen is lost in the display screen, the position and the size of the main object region are renewed to disappear.

In addition, the object frame for indicating the main object region designated by user's direct touch on the display screen is turned off, then plural focus frames may be displayed instead as is the case where the main object is not detected, and the process flow proceeds to the step S308.

In the step S308, it is determined whether or not the priority object setting has been temporarily changed in response to user's focus detection instruction in a step S317, which will be explained in detail below.

If it is determined that the priority object setting has been temporarily changed ("Yes" in the step S308), the process flow proceeds to the step S309, and if it is determined that the priority object setting has not been temporarily changed ("No" in the step S308), the process flow proceeds to a step S313.

In the step S309, the priority object setting that has been temporarily changed in a step S317, which will be explained below, is read out from the system memory 56, is restored to the previous setting, and then the process flow proceeds to the step S313.

In the step S310, it is determined whether or not the object whose category is the same as the category set by the priority object setting is detected in the object detection performed in the step S303.

That is, if the priority object setting is "human", it is determined whether objects of the category "human" is detected or not, and if the priority object setting is "animal", it is determined whether objects of the category "animal" is detected or not.

If "Yes" in the steps S310, the process flow proceeds to the step S313, and "No" in the steps S310, the process flow proceeds to the step S312.

In the step S311, the main object region is selected based on a result of the object detection performed in the step S303, and the position and the size of the main object region are renewed.

In addition, the position and the size of the object frame, which is displayed on the display screen of the display unit 28 in an automatic selection condition for indicating the main object region, are also renewed, then the process flow proceeds to the step S313.

In step S312, it is determined that the main object whose category is the same as the category set by the priority object setting is not detected, and the position and the size of the main object region is reset to 0, and the object frame, which is displayed on the display screen of the display unit 28 in an automatic selection condition for indicating the main object region, is renewed to disappear, then the process flow proceeds to the step S313.

Steps S310 to S312 correspond to an automatic selection process in the digital camera 100 for selecting the main object, in which an optimum object is automatically selected from objects whose category has been set by the priority object setting and an object frame indicating the main object region selected by the automatic selection is displayed.

In the step S313 in FIG. 10, it is determined whether or not an instruction to start the focus detection in response to user's pressing of the first shutter release switch 62 is detected. If "Yes" in the step S313, the process flow proceeds to the step S314, and if "No" in the step S313, the process flow proceeds to the step S320.

That is, by operating a predetermined operation member after the focus detection region on the display screen is set, the designation of the object region is finally determined.

In the step S314, it is determined whether or not the focus detection frame that indicates a starting position of the focus detection is overlapping with the object detection region of the object whose category is the same as the category set in the priority object setting, among object detection regions detected in the step S303.

That is, if the priority object setting is "human", it is determined whether the focus detection frame overlaps with the human detection region or not, and if the priority object setting is "animal", it is determined whether the focus detection frame overlaps with the animal detection region or not.

If "Yes" in the step S314, the process flow proceeds to the step S315, and if "No" in the step S314, the process flow proceeds to the step S316.

In the step S315, the object detection region of the object whose category is the same as the category (the first category) set by the priority object setting, and which is overlapping with the focus detection frame indicating the starting position of the focus detection, is set as the "user selection main object region", then the process flow proceeds to the step S320.

In the step S316, it is determined whether or not the focus detection frame that indicates a starting position of the focus detection is overlapping with the object detection region of the non-priority object, whose category is not the first category, among object detection regions detected by the object detection in the step S303.

That is, if the priority object setting is "human", it is determined whether or not the focus detection frame overlaps with the object detection region whose category is "animal" or categories other than "human", or if the priority object setting is "animal", it is determined whether or not the focus detection frame overlaps with the object detection region whose category is "human" or categories other than "animal".

If the focus detection frame overlaps with the object detection region of the non-priority object ("Yes" in the step S316), the process flow proceeds to the step S317.

That is, if the priority object setting is "human", and if it is determined that the focus detection frame overlaps with the object detection region whose category is "animal" or categories other than "human", the process flow proceeds to the step S317.

Or, if the priority object setting is "animal", and if it is determined that the focus detection frame overlaps with the object detection region whose category is "human" or categories other than "animal", the process flow proceeds to the step S317.

On the contrary, if it is determined that the focus detection frame does not overlap with the object detection region of the non-priority object ("No" in the step S316), the process flow proceeds to the step S319.

That is, despite the priority object setting, if it is determined that the focus detection frame is overlapping with the object detection region of the object whose category is not any of "human" and "animal", which are categories of the object detection regions detected in the object detection process in the step S303, the process flow proceeds to the step S319.

Or, if it is determined that the focus detection frame is overlapping with the region where detected objects do not exist, the process flow proceeds to the step S319.

In the step S317, the priority object setting (the first category) set in advance is saved in a predetermine region in the system memory 56, and the category (the first category) set in the priority object setting is temporarily changed to a different category (the second category), then the process flow proceeds to the step S318.

That is, if the priority object setting is "human", and if the focus detection is started with the focus detection frame overlapping with "animal", the setting "human" is saved in the system memory 56 and the priority object setting is temporarily changed to "animal", or if the priority object setting is "animal", and if the focus detection is started with the focus detection frame overlapping with "human", the setting "animal" is saved in the system memory 56 and the priority object setting is temporarily changed to "human".

In step S318, the object detection region of the non-priority object overlapping with the focus detection frame is set as the "user selection main object region", and the process flow proceeds to the step S320.

That is, the object detection region that corresponds to the priority object setting temporarily changed in the step S317 is set as the main object region, which is as the "arbitral selection condition", the process flow proceeds to the step S320.

In the step S319, since the region with which the focus detection frame is overlapping does not include objects detection region, plural focus detection frames are displayed as in a case where no object is detected, and the process flow proceeds to the step S320. In that case, the focus adjustment and the exposure adjustment are performed with regard to the plural focus detection frames.

In the step S320, it is determined whether the first shutter release switch 62 is still being pressed by the user or not, and if "Yes", the process flow proceeds to the step S323, and if "No", the process flow proceeds to the step S321.

In the step S321, it is determined whether or not the priority object setting has been temporarily changed in the step S317 in response to user's instruction to start the focus detection in an image frame immediately before the current image frame, and if "Yes" in the step S321, the process proceeds to a step S322, and if "No" in the step S321, the process proceeds to a step S323.

In the step S322, the priority object setting temporarily changed and saved in the system memory 56 is read out and restored, and the process proceeds to the step S323.

In the step S323, it is determined whether or not the start of the photography is instructed by user's operation, for example, of the shutter release button 61 or the movie image photography button of the operation unit 70.

If "Yes" in the step S323, the process proceeds to a step S324, and if "No" in the step S323, the process returns to a step S302, and processing of next image frames is started.

In the step S324, a photography process such as the still image photography or the movie image photography is carried out, then the process proceeds to a step S325.

In the photography process, image data captured by the image pickup unit 22 is read out and is processed by the image processing unit 24 so as to be developed and compressed and so on, then is stored in the storage unit 200 via the I/F 18.

In the step S325, in response to the use's instruction to start focus detection, it is determined whether or not the priority object setting is temporarily changed in the step S317, and if "Yes" in the step S325, the process flow proceeds to a step S326, and if "No" in the step S325, the process flow returns to the step S302, and processing of next image frames is started.

In the step S326, the previous priority object setting stored in the system memory 56 in the step S317 is discarded, and the priority object setting temporarily changed before is stored as a user setting, the process flow returns to the step S302, and processing of next image frames is started.

Figure 11A:
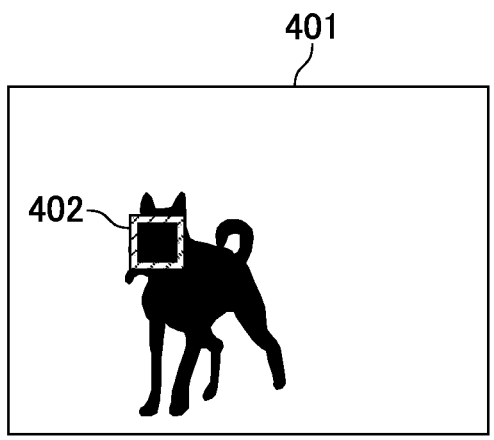
FIGS. 11A and 11B are diagrams illustrating examples of the display screen in Embodiment 3.
Figure 11B:
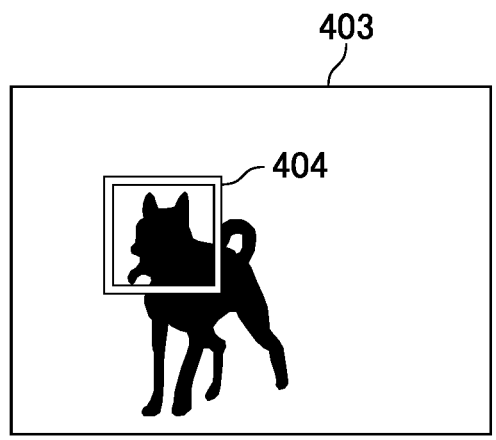

FIGS. 11A and 11B are diagrams illustrating examples of the display screen in Embodiment 3. FIG. 11A illustrates an example of the display screen when the priority object setting is "human", FIG. 11B illustrates an example of the display screen when a user presses a first shutter release button 62 to start a focus detection operation.

401 in FIG. 11A denotes an display screen on the display unit 28 when the priority object setting is "human", in a dog is displayed on the display screen.

Since the priority object setting is "human", it is determined whether or not "human" is detected in the step S310. However, as "human" is not detected in the display screen 401, the object frame indicating the main object is not displayed on the display screen in the step S312, while the focus detection frame 402 that indicates a starting position of the focus detection is manually or automatically displayed on the display screen 401.

404 in FIG. 11B denotes a display screen on the display unit 28 when a user presses the first shutter release switch 62 to start a focus detection operation.

As illustrated in FIG. 11A, the focus detection frame 402 that indicates a starting position of the focus detection is displayed on an object detection region of an object whose category is "animal", which is different from the category "human" set in the priority object setting.

In this state, if the first shutter release switch 62 is depressed, the priority object setting is temporarily changed from "human" to "animal" in the step S317, and an object frame 404 for the "user selection main object" is displayed on the object whose category is "animal" in the step S318.

As explained in the above, in Embodiment 3, like Embodiment 1 and Embodiment 2, a user can set a category of an intended object by using the priority object setting, by using the setting menu on the display screen and so on, so that the intended object can be exclusively set as the main object.

In addition, if the user wants to set an intended non-priority object as the main object, the user can manually set the focus detection frame 402 that indicates a starting position of the focus detection on the intended non-priority object and can instruct to start the focus detection by pressing the shutter release switch 62.

Therefore, the priority object setting can be temporarily changed, so that the intended object whose category is different from the category set in advance by the priority object setting can be newly set as the main object.

By this way, like Embodiment 1 and Embodiment 2, without troublesome operations such as opening a setting menu on the display screen each time when changing the category for the main object, the category of the priority object setting can be quickly changed during displaying the live view images, so that the category of an intended object can be easily changed to the main object.

In addition, if the intended object is lost or if the pressing of the first shutter release switch 62 is stopped, the temporarily changed priority object setting is smoothly restored.

Embodiment 4

Next, Embodiment 4 will be explained.

In Embodiment 1 and Embodiment 2, if a user wants to set an intended non-priority object as the main object, by touching the intended object on the display screen and so on, the priority object setting can be temporarily changed, so that the intended object can set as the main object.

In Embodiment 3, when a user manually set the focus detection frame 402 that indicates a starting position of the focus detection on the intended non-priority object and instructs to start the focus detection by pressing the shutter release switch 62 and so on, the priority object setting can be temporarily changed, so that the intended object whose category is different from the category set in advance by the priority object setting can be newly set as the main object.

On the contrary, in Embodiment 4, an icon or characters that indicates a current priority object setting displayed on the display screen, or a predetermined button in the operation unit 70 is allotted with a function for changing the priority object setting. And, by touching the icon or characters on the display screen or by pressing the predetermined button, the priority object setting is changed, so that an intended object can be easily changed to the main object.

By this way, like Embodiments 1 to 3, without troublesome operations such as opening a setting menu on the display screen each time when changing the category for the main object, the category of the priority object setting can be quickly changed during displaying the live view images, so that the category of an intended object can be easily changed to the main object.

Figure 12:
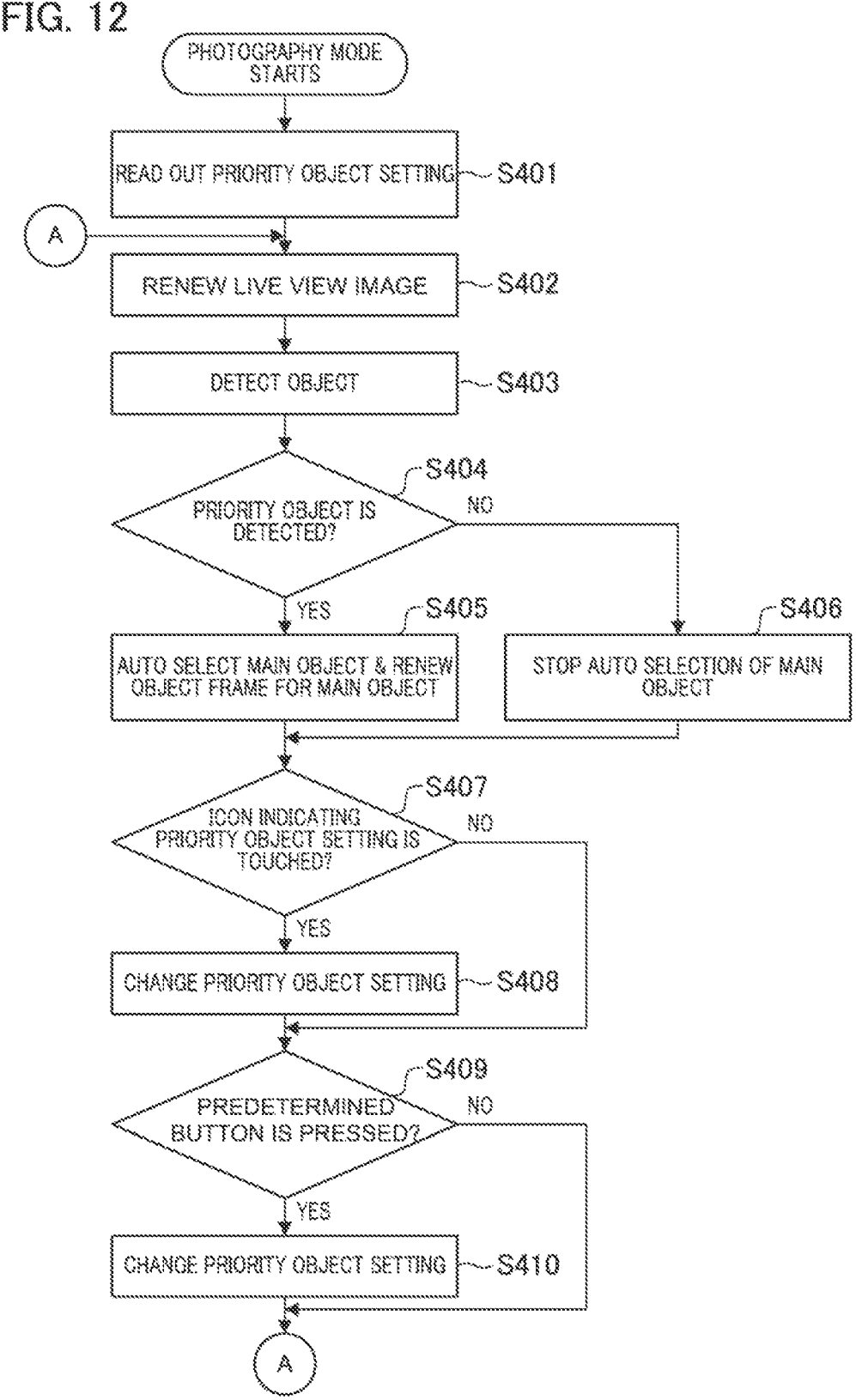
FIG. 12 is a flowchart illustrating an operation of the image processing apparatus in Embodiment 4.

FIG. 12 is a flowchart illustrating an operation of the image processing apparatus in Embodiment 4.

In Embodiment 4, repeated description or explanation on the same processes as those in Embodiments 1 to 3 will be omitted.

In a case where a user selects one of the still image photography mode and the movie image photography mode by using the mode switch 60, and the digital camera 100 stars the selected photography mode, the process flow illustrated in FIG. 12 is executed.

The Process flow illustrated in FIG. 12 is performed by the system control unit 50 by reading out the predetermined programs from the nonvolatile memory 52, by expanding the program in the system memory 56, and by controlling operations or processes of each unit included in the digital camera 100.

In a step S401, the priority object setting set in advance by a user is read out from the system memory 56, so that the category of the main object is determined, then the process flow proceeds to a step S302.

In addition, icons or characters indicating the priority object setting is displayed on the display screen of the display unit 28, then the process flow proceeds to a step S402.

Steps S402 and S403 are respectively the same as the steps S102 and S103 in Embodiment 1, so that repeated description of them will be omitted.

In a step S404, it is determined whether or not the object whose category is the same as the category set by the priority object setting is detected in the object detection performed in the step S403.

That is, if the priority object setting is "human", it is determined whether objects of the category "human" is detected or not, and if the priority object setting is "animal", it is determined whether objects of the category "animal" is detected or not.

If "Yes" in the steps S404, the process flow proceeds to the step S405, and "No" in the steps S404, the process flow proceeds to the step S406.

In the step S405, the main object region is selected based on a result of the object detection performed in the step S403, and the position and the size of the main object region are renewed.

In addition, the position and the size of the object frame, which is displayed on the display screen of the display unit 28 in the automatic selection condition for indicating the main object region, are also renewed, then the process flow proceeds to the step S407.

In step S406, since it is determined that the main object whose category is the same as the category set by the priority object setting is not detected, the automatic selection for the main object is turned off, the position and the size of the main object region is reset to 0, and the object frame, which is displayed on the display screen of the display unit 28 in the automatic selection condition for indicating the main object region, is renewed to disappear, then the process flow proceeds to the step S407.

Steps S404 to S406 correspond to an automatic selection process in the digital camera 100 for selecting the main object, in which an optimum object is automatically selected from objects whose category has been set by the priority object setting and an object frame indicating the main object region selected by the automatic selection is displayed.

In a step S407, it is determined whether or not the icon or characters, which indicates the current priority object setting, displayed on the display screen is touched by a touch operation to the touch panel operation unit 72.

If "Yes" in the step S407, the process flow proceeds to a step S408 and if "No" in the step S407, the process flow proceeds to a step S409.

In the step S408, the current priority object setting is changed to another category.

For example, if the priority setting is "human", the priority setting is changed to "animal", if the priority setting is "animal", the priority setting is changed to "human".

If the priority object setting includes more than two categories, each time the icon or the character on the display screen is touched, setting may be sequentially and cyclically changed, or the category may be changed to a category other than the category set as the priority object setting, which is detected in the step S403, In a step S409, it is determined whether or not the predetermined button that is allotted with the function for changing the priority object setting is pressed by a user.

If "Yes" in the step S409, the process flow proceeds to a step S410, if "No" in the step S409, the process flow returns to the step S402 and starts processing a next image frame.

In the step S410, the current priority object setting is changed to another category.

For example, if the current priority object setting is "human", the current priority object setting is changed to "animal", and if the current priority object setting is "animal", the current priority object setting is changed to "human".

If the priority object setting includes more than two categories, each time the icon or the character on the display screen is touched, setting may be sequentially and cyclically changed, or the category may be changed to a category other than the category set as the priority object setting, which is detected in the step S 403.

As explained in the above, in Embodiment 4, like Embodiment 1 and Embodiment 2, a user can set a category of an intended object by using the priority object setting, specifically by using the setting menu on the display screen and so on, so that the intended object can be exclusively set as the main object.

In addition, if the user wants to set an intended non-priority object as the main object, by touching an icon or characters that indicates a current priority object setting, the priority object setting is quickly changed, so that an intended object can be easily changed to the main object.

Or, by pressing a predetermined button in the operation unit 70 allotted with a function for changing the priority object setting, the priority object setting is quickly changed, so that an intended object can be easily changed to the main object.

Thus, like Embodiments 1 to 3, without troublesome operations such as opening a setting menu on the display screen each time when changing the category for the main object, the category of the priority object setting can be quickly changed during displaying the live view images, so that the category of an intended object can be easily changed to the main object.

In this regard, although the image processing apparatus in the above Embodiments is explained by using the image pickup apparatus, the image processing apparatus may be a PC, a tablet, or the like that does not have image pickup function.

In addition, units in the above Embodiments may include discrete electric circuits or a FPGA, a CPU, and so on.

While the present invention has been described with reference to exemplary Embodiments, it is to be understood that the invention is not limited to the disclosed exemplary Embodiments. The scope of the following claims is to be accorded the broadest interpretation so as to encompass all such modifications and equivalent structures and functions.

Meanwhile, a computer program for realizing some or all of the controls in the present Embodiments and the functions of the above-described Embodiments may be supplied to an image processing device through a network or various storage mediums. In addition, a computer in the image processing device (or a CPU, an MPU, or the like) may read and execute computer programs. In this case, the programs and a storage medium storing the programs constitute the present invention.

This application claims the benefit of Japanese Patent Application No. 2020-26290 filed on Feb. 19, 2020, which is hereby incorporated by reference herein in its entirety.

What is claimed is:

1. An image processing apparatus comprising:
at least one processor or circuit configured to function as:
an object detection unit configured to detect objects categorized as at least two categories from an image;
a setting unit configured to set a first category as a main category so that an object of the main category is to be tracked by a tracking unit; and
a region designation unit configured to designate a predetermined region on a display screen as a region including a main object,
wherein the setting unit is configured to change the main category from the first category to a second category different from the first category in a case where the object detected by the object detection unit on the predetermined region designated by the region designation unit is the second category, and
wherein the setting unit is configured to set the second category as an initial main category in a case where an image pickup operation is started by using a predetermined operation unit after the setting unit changes the main category from the first category to the second category.

2. The image processing apparatus according to claim 1, wherein the region designation unit designates the predetermined region in a case where the predetermined region on the display screen is touched.

3. The image processing apparatus according to claim 1, wherein the region designation unit designates the predetermined region in a case where the predetermined region on the display screen is designated by a pointing device.

4. The image processing apparatus according to claim 1, wherein the region designation unit designates the predetermined region according to setting a focus detection region on the display screen.

5. The image processing apparatus according to claim 4, wherein the region designation unit designates the predetermined region in a case where the focus detection region is set on the display screen and then focus detection is started by operating a predetermined operation unit.

6. The image processing apparatus according to claim 5, wherein the predetermined operation unit includes a shutter release button.

7. The image processing apparatus according to claim 1, wherein the setting unit is configured to set the first category by using a menu selection on the display screen.

8. The image processing apparatus according to claim 1, wherein the at least one processor or circuit is further configured to function as the tracking unit configured to track the object on the predetermined region designated by the region designation unit based on color information or luminance information extracted from the predetermined region.

9. The image processing apparatus according to claim 1, further comprising a display unit configured to display the object corresponding to the main category differently from other object.

10. The image processing apparatus according to claim 9, wherein the display unit is configured to display a frame on the object detected by the object detection unit.

11. The image processing apparatus according to claim 10, wherein the setting unit is configured to set a category for the object corresponding to which the display unit displays the frame.

12. The image processing apparatus according to claim 1, wherein the at least one processor or circuit is further configured to function as the tracking unit that
adjusts a focus condition of a focus lens or an exposure condition of a light amount to an image pickup unit on a priority basis with regard to the predetermined region of the object of which category is corresponding to the main category.

13. The image processing apparatus according to claim 1, wherein the object detection unit detects the objects based on learning models generated by a machine learning, and when the setting unit sets the main category on the object, the object detection unit detects the object based on the learning models corresponding to the object.

14. The image processing apparatus according to claim 13, wherein the object detection unit detects the object exclusively using a learning model generated by the machine learning corresponding to the object on which the setting unit sets the main category.

15. The image processing apparatus according to claim 1, wherein the object detection unit is configured to detect a part of the object.

16. An image pickup apparatus comprising:
at least one processor or circuit configured to function as:
an image pickup unit configured to obtain an object image;
an object detection unit configured to detect objects categorized as at least two categories from the object image obtained by the image pickup unit;
a setting unit configured to set a first category as a main category so that an object of the main category is to be tracked by a tracking unit; and
a region designation unit configured to designate a predetermined region on a display screen as a region including a main object;
wherein the setting unit is configured to change the main category from the first category to a second category different from the first category in a case where the object detected by the object detection unit on the predetermined region designated by the region designation unit is the second category, and
wherein the setting unit is configured to set the second category as an initial main category in a case where an image pickup operation is started by a predetermined operation unit after the setting unit changes the main category from the first category to the second category.

17. An image processing method comprising:
detecting objects categorized as at least two categories from an image;
setting a first category as a main category so that an object of the main category is to be tracked by a tracking unit; and designating a predetermined region on a display screen as a region including a main object;

wherein the main category is changed from the first category to a second category different from the first category in a case where the object detected by the detecting on the predetermined region designated by the designating is the second category, and wherein the second category is set as an initial main category in the setting in a case where an image pickup operation is started by a predetermined operation unit after the main category is changed from the first category to the second category.

18. A non-transitory computer-readable storage medium that stores a computer program for executing the following:

detecting objects categorized as at least two categories from an image;

setting a first category as a main category so that an object of the main category is to be tracked by a tracking unit; and designating a predetermined region on a display screen as a region including a main object;

wherein the main category is changed from the first category to a second category different from the first category in a case where the object detected by the detecting on the predetermined region designated by the designating is the second category type, and wherein the second category is set as an initial main category in the setting in a case where an image pickup operation is started by a predetermined operation unit after the main category is changed from the first category to the second category.

* * * * *